Figure 1:
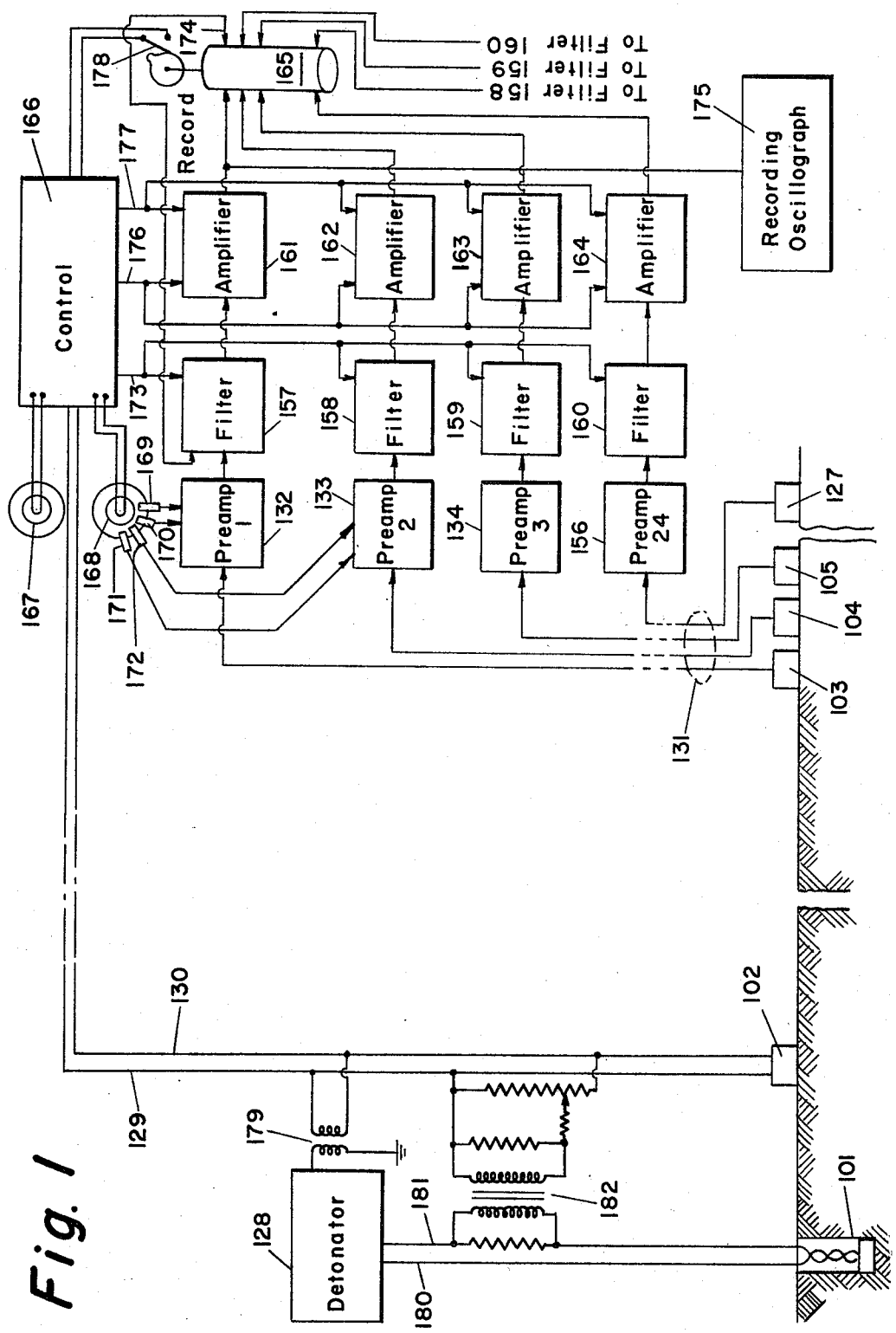

Nov. 22, 1966    F. M. ROMBERG    3,287,694
SEISMIC AMPLIFIER SYSTEM
Filed April 12, 1963    16 Sheets-Sheet 1

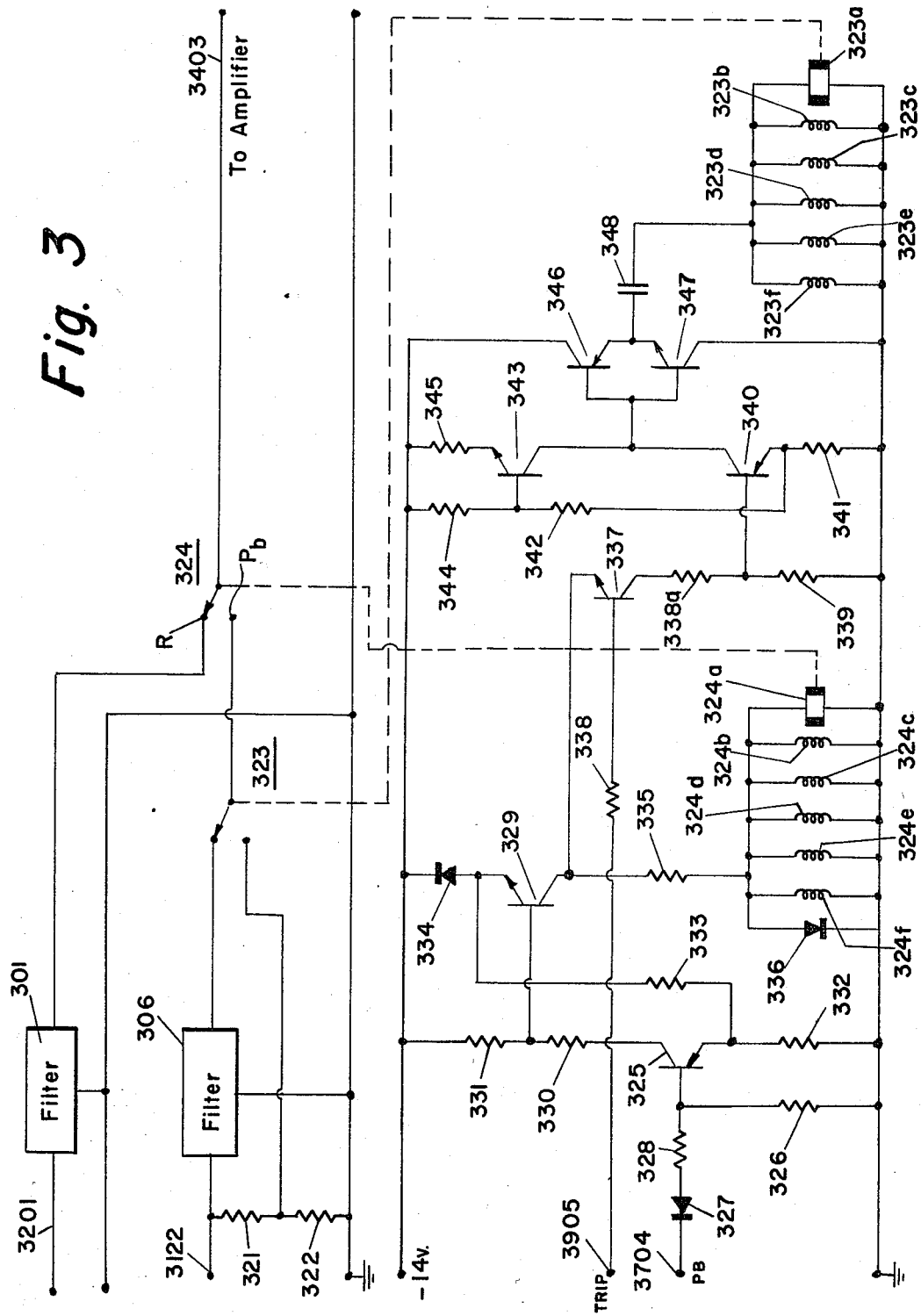

Nov. 22, 1966  F. M. ROMBERG  3,287,694
SEISMIC AMPLIFIER SYSTEM
Filed April 12, 1963  16 Sheets-Sheet 6
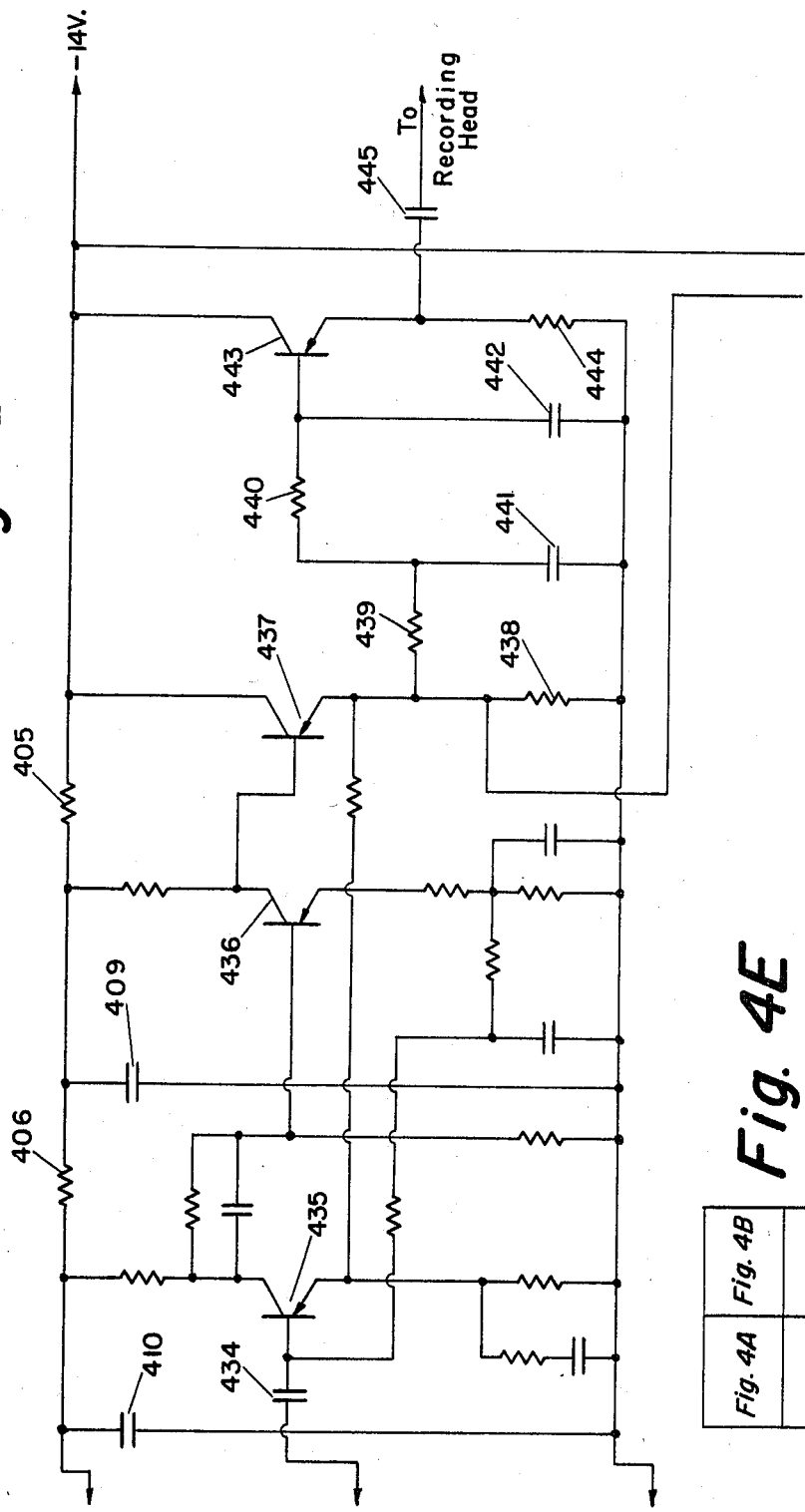

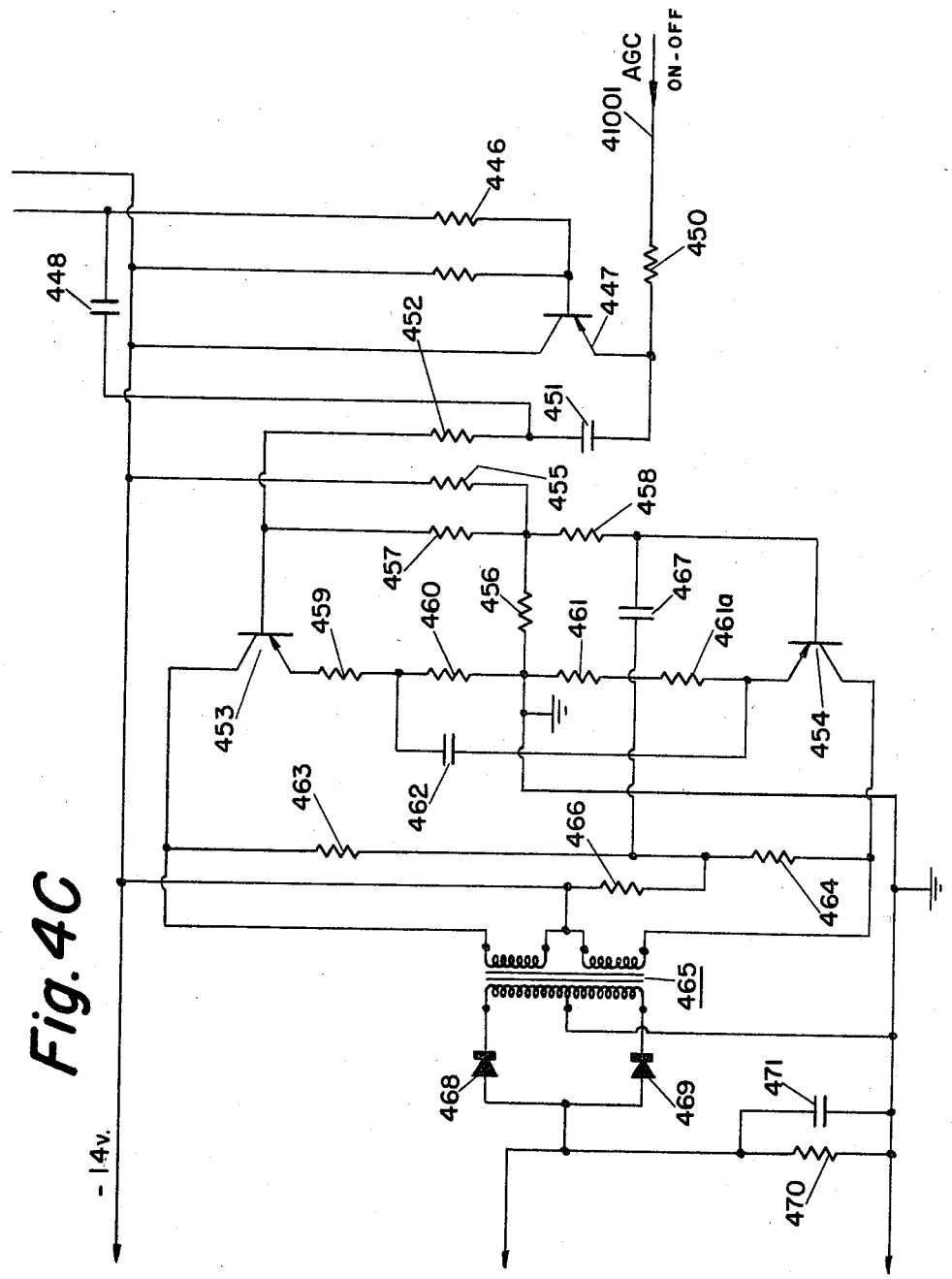

Nov. 22, 1966  F. M. ROMBERG  3,287,694
SEISMIC AMPLIFIER SYSTEM
Filed April 12, 1963  16 Sheets-Sheet 8

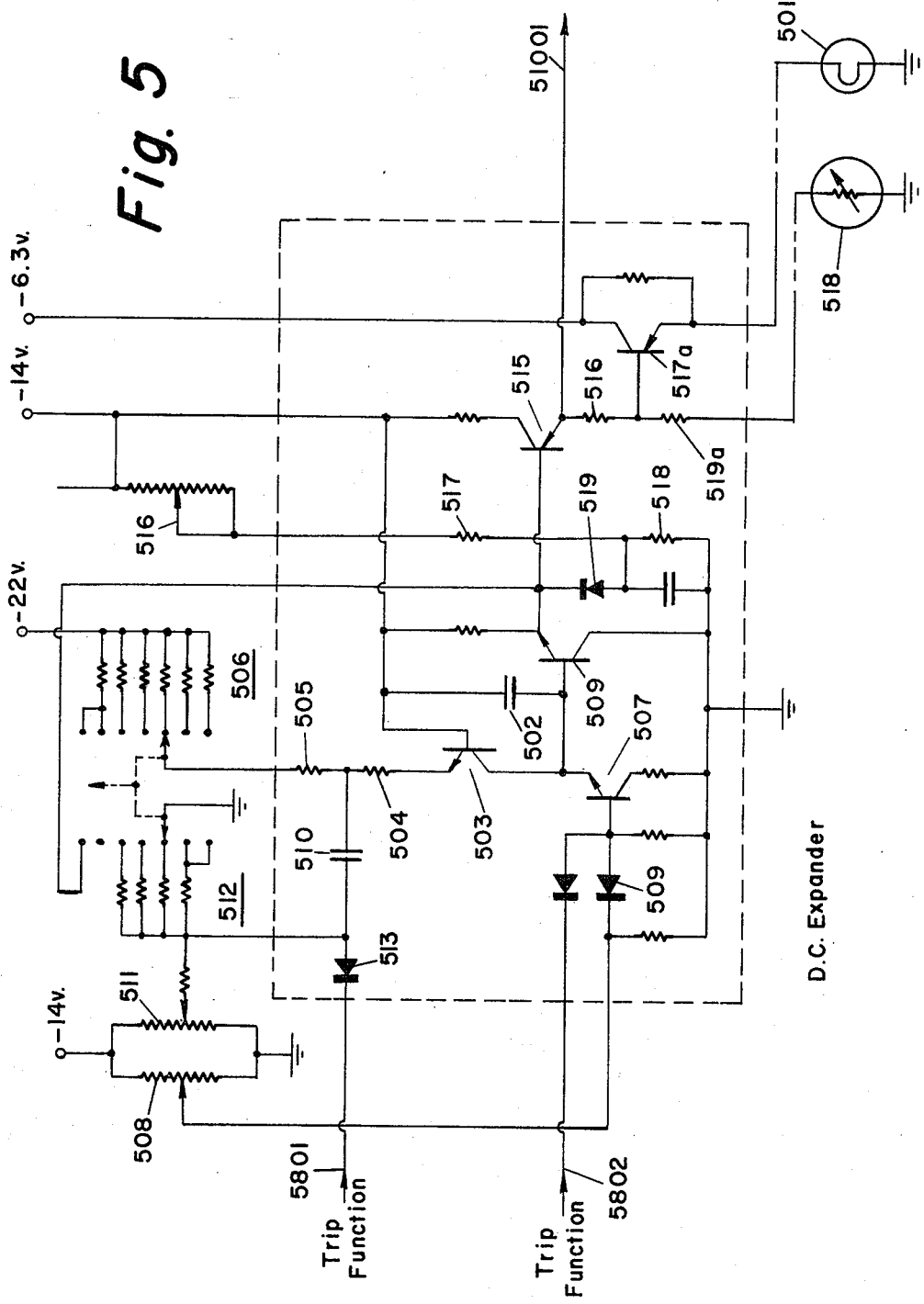

Nov. 22, 1966  F. M. ROMBERG  3,287,694
SEISMIC AMPLIFIER SYSTEM
Filed April 12, 1963  16 Sheets-Sheet 10

Nov. 22, 1966   F. M. ROMBERG   3,287,694
SEISMIC AMPLIFIER SYSTEM
Filed April 12, 1963   16 Sheets-Sheet 12

Nov. 22, 1966 F. M. ROMBERG 3,287,694
SEISMIC AMPLIFIER SYSTEM
Filed April 12, 1963 16 Sheets-Sheet 15

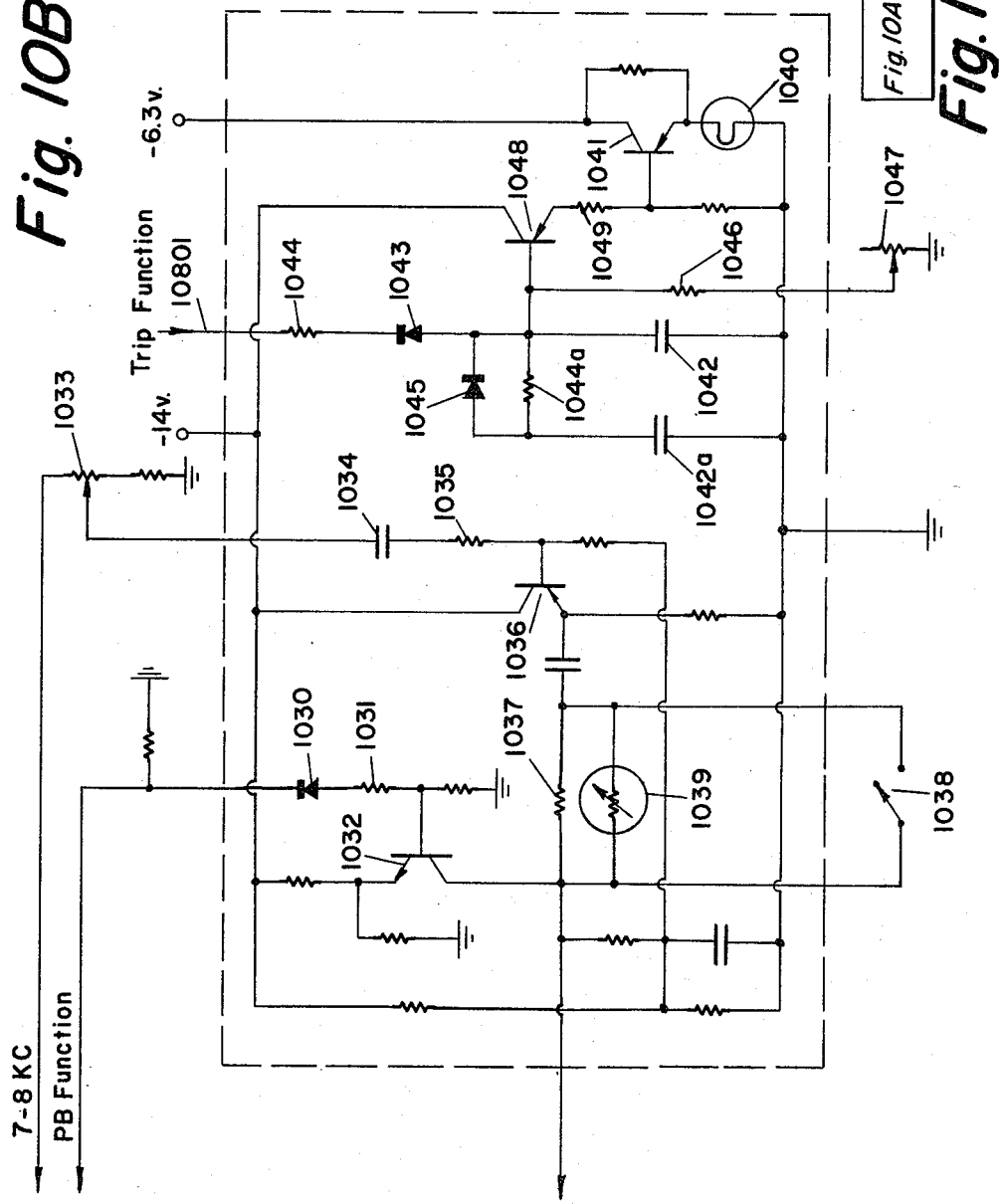

United States Patent Office 3,287,694
Patented Nov. 22, 1966

3,287,694
SEISMIC AMPLIFIER SYSTEM
Francis M. Romberg, Irving, Tex., assignor, by mesne assignments, to Dyna-Tronics Mfg. Corp., a corporation of Texas
Filed Apr. 12, 1963, Ser. No. 272,735
14 Claims. (Cl. 340—15.5)

This invention relates to amplifier systems and, more particularly, to an amplifier system for recording seismic signals on a reproducible medium and for playing back the seismic signals from the reproducible medium.

In seismic exploration it is the usual practice to detonate an explosive charge to generate seismic impulses which create seismic waves. These seismic waves are detected and the resultant seismic signals provide useful information regarding the geophysical characteristics of the area being explored.

It is the usual practice to record these seismic signals on a reproducible medium such as a magnetic drum. The reproducible medium is usually positioned at a distance from the detectors. In order to properly record the seismic signals, it is necessary to provide an amplifier system which amplifies the seismic signals before recording.

Further, the characteristics of the seismic signals to be recorded change considerably after the initiation of the seismic signals. For example, the amplitude of the seismic signals is quite large immediately after the detonation of the explosive charge but the amplitude decreases rapidly thereafter. In order to compensate for this it is necessary to change the gain of the amplifier system as the time after the initiation of the seismic waves increases. It is also desirable to change other characteristics of the amplifying system in response to the initiation of seismic signals which are to be recorded.

In order to accomplish this, a control unit is provided which controls the operation of the amplifying system in timed relation to the generation of the seismic signals to be recorded.

The amplifying system used to record the seismic signals on the reproducible medium is also used during the playback of the seismic signals from the reproducible medium. Again, it is desirable to change the characteristics of the amplifying system as the playback of the seismic signals progresses. This control is provided by the same control unit which is used in the record operation.

Amplifying systems and control units of the prior art have not been entirely suitable for all purposes. Commonly, these amplifying systems and control units have utilized vacuum tube amplifiers and control relays. These components are particularly susceptible to failure under conditions of rough handling which is usually present when the equipment is used in the field.

In accordance with one aspect of my invention, the above disadvantages are overcome by providing an amplifying system and control unit therefor which primarily utilize solid state devices such as transistors.

Transistor amplifiers of the prior art have not been entirely suitable for recording and playing back seismic signals. In order to vary the gain of these transistor amplifiers, it has been the common practice to provide a variable impedance base circuit for the transistor. This requires a higher impedance than would otherwise be needed in the base circuit and this higher impedance makes the transistor more susceptible to noise.

In accordance with another aspect of my invention, this problem is reduced by utilizing a variable impedance emitter circuit for the transistor amplifiers. Utilizing a variable impedance emitter circuit to control the gain of the transistor amplifier has further advantages in seismic recording in that this makes it possible to vary the current feedback of the transistor in a manner which produces the least distortion of the seismic signals.

In accordance with a further aspect of my invention, the gain of a plurality of preamplifiers in the seismic signal amplifier system is simultaneously varied by varying the intensity of a source of light which is incident upon a plurality of photo-resistors contained in the emitter circuits of transistors in each of the preamplifiers. In this manner the impedance of the emitter circuits of these transistors is varied.

In accordance with further aspects of my invention, the characteristics of a plurality of amplifiers in the seismic signal amplifier system are simultaneously varied by changing the amplitude of an injection signal and by changing the amplitude of a limiter signal in a programmed manner under control of the control unit. The injection signal acts through the gain control circuitry of each amplifier to change the gain of this amplifier and the limiter signal changes the attack time of the automatic gain control circuitry. In this manner, the characteristics of each amplifier in the amplifying system are changed in a programmed manner in response to the initiation of seismic signals.

Figure 2:
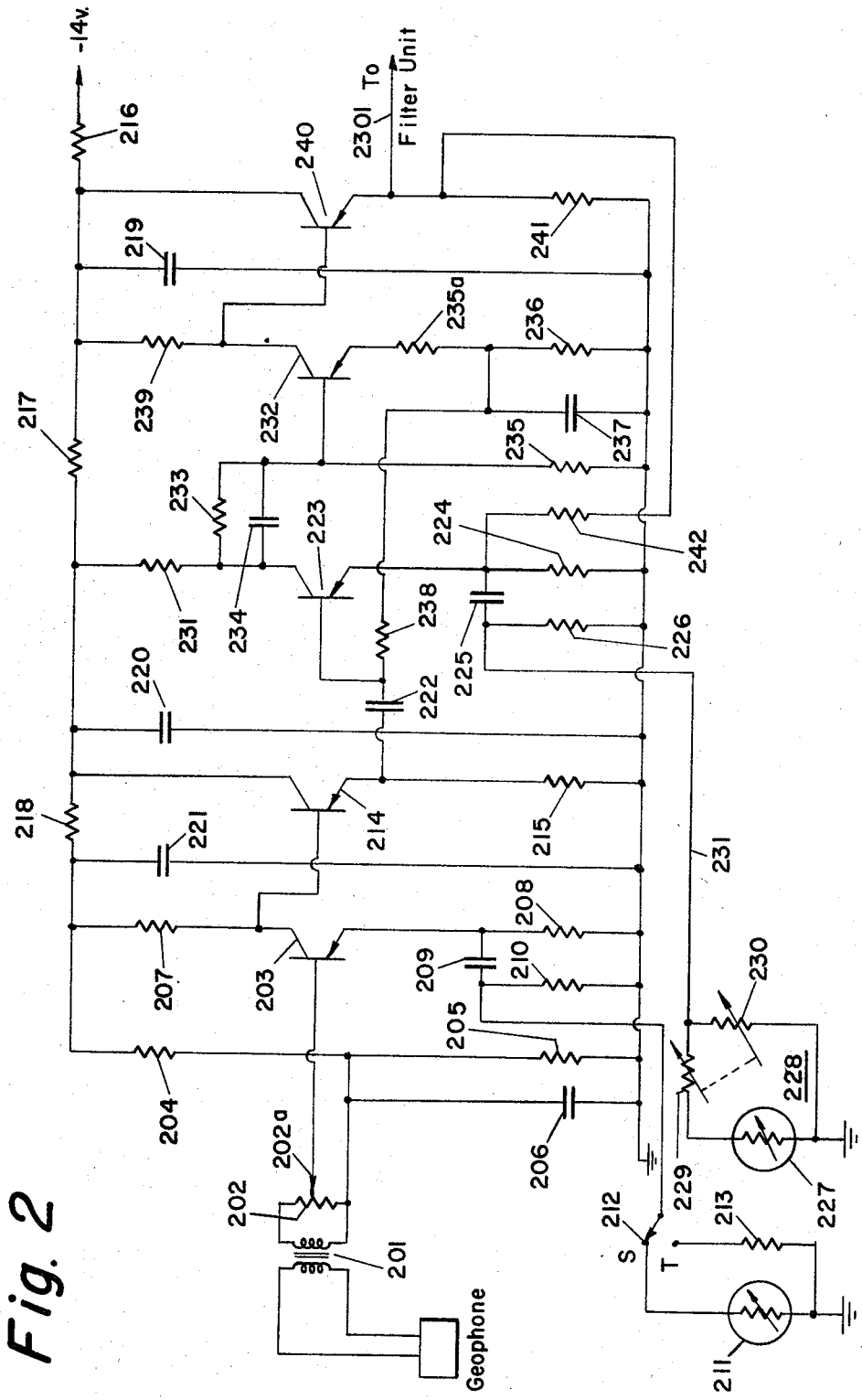
Figure 3A:
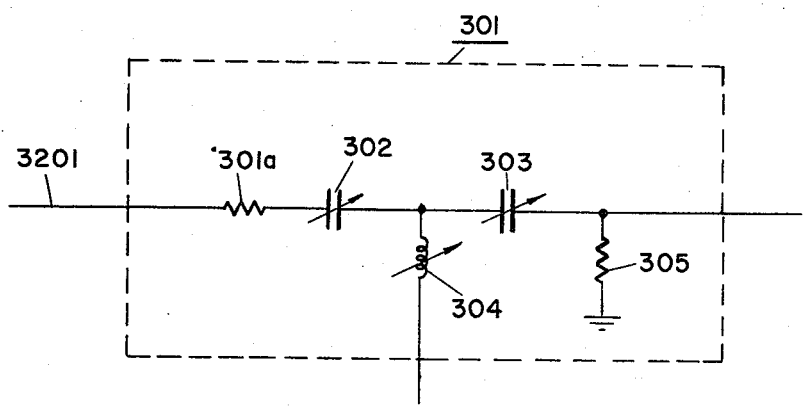
Figure 3B:
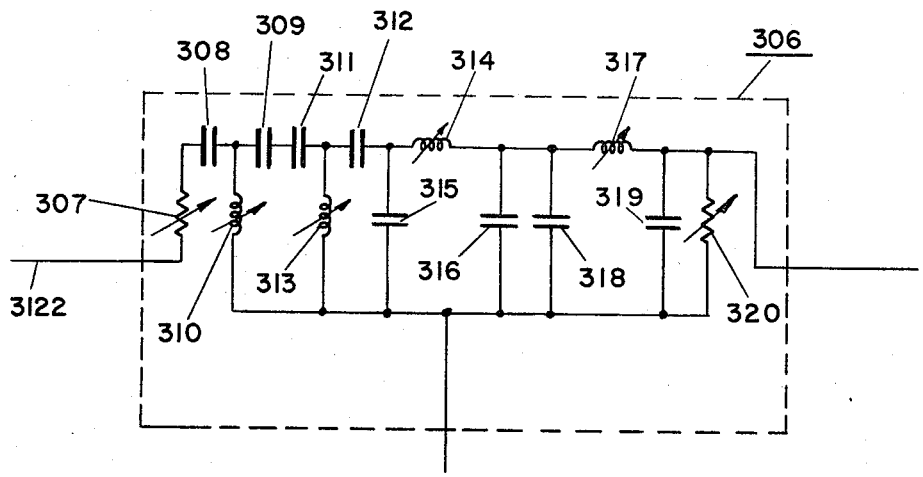
Figure 4A:
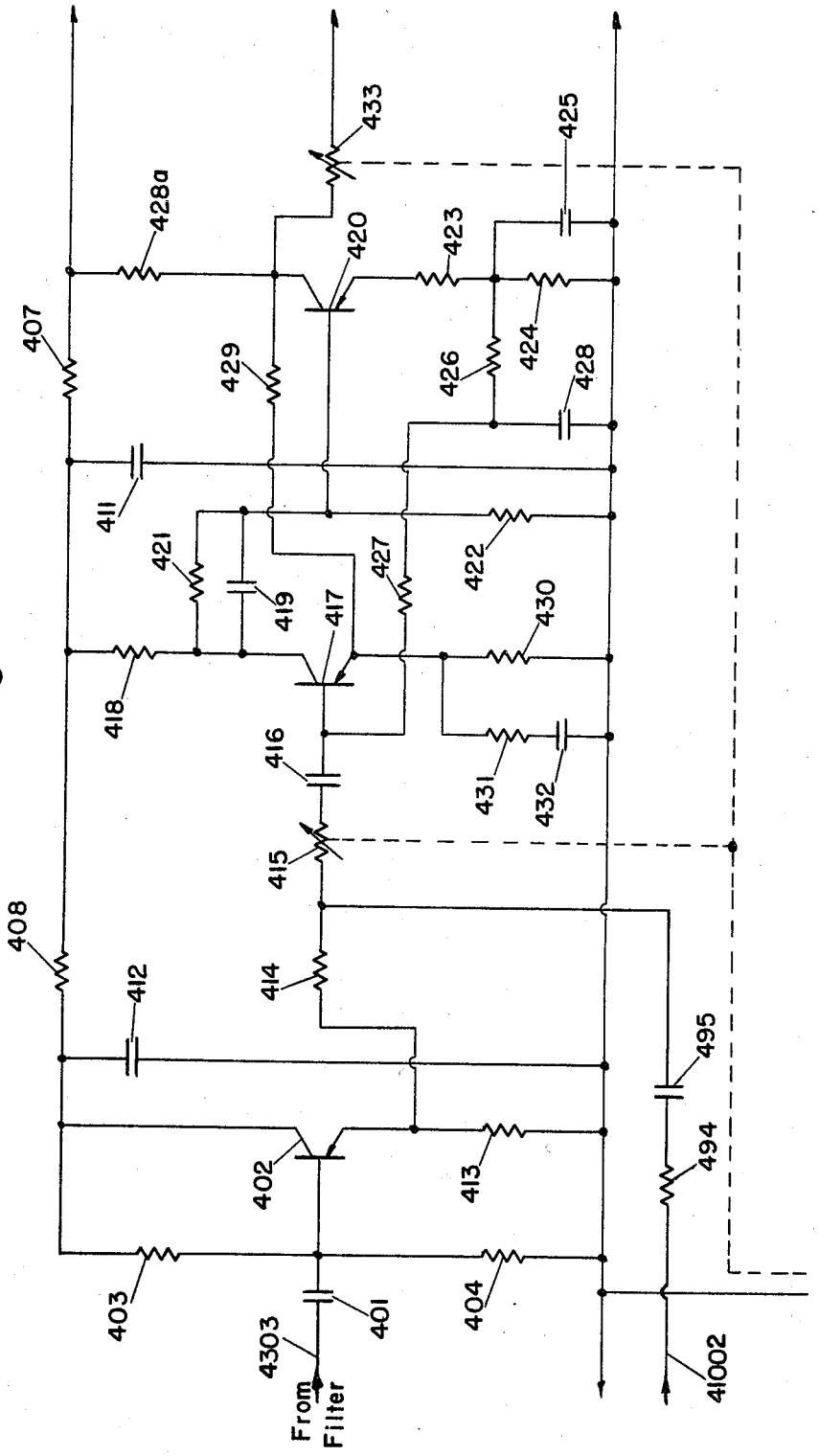
Figure 4D:
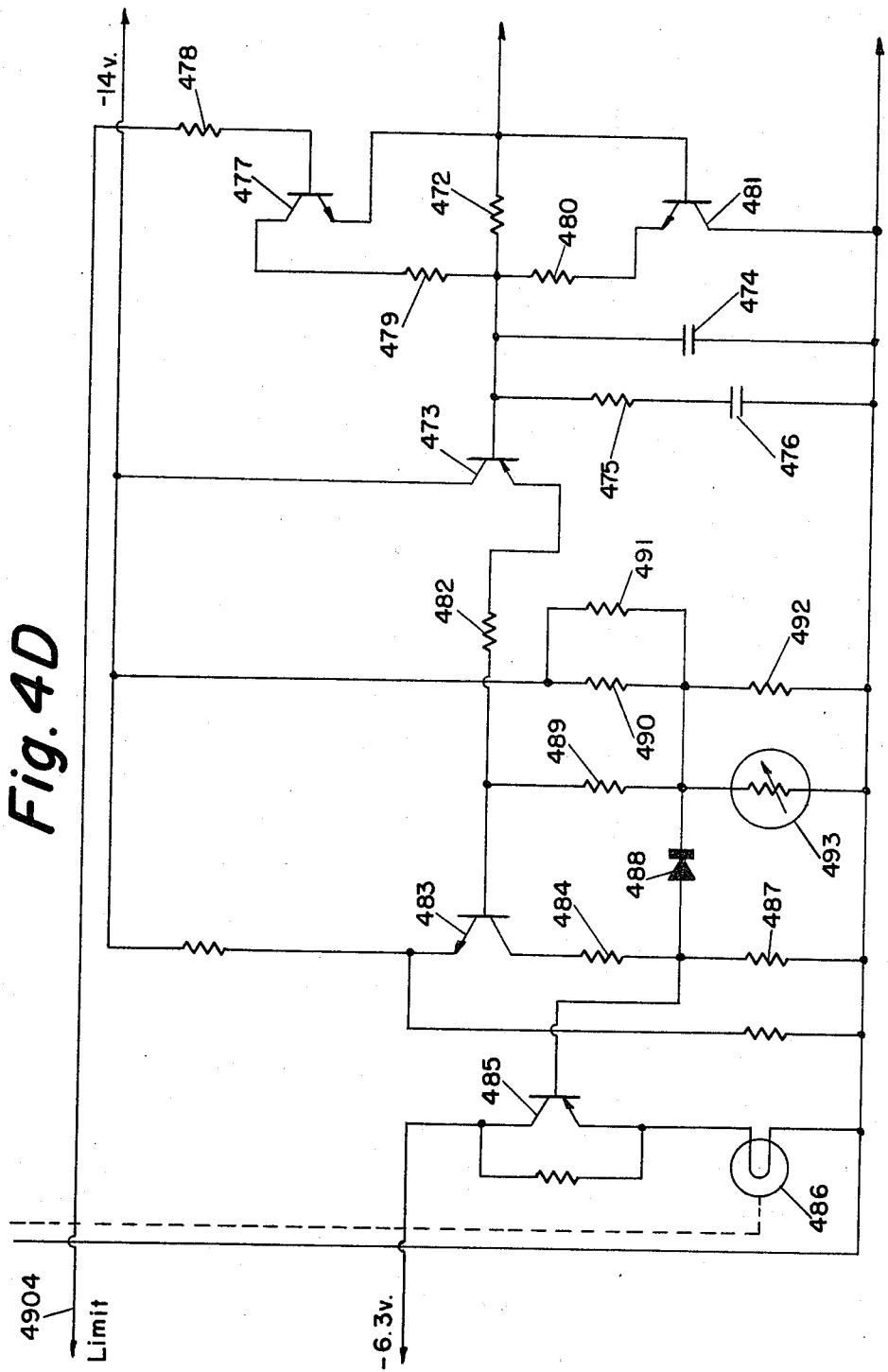
Figure 5A:
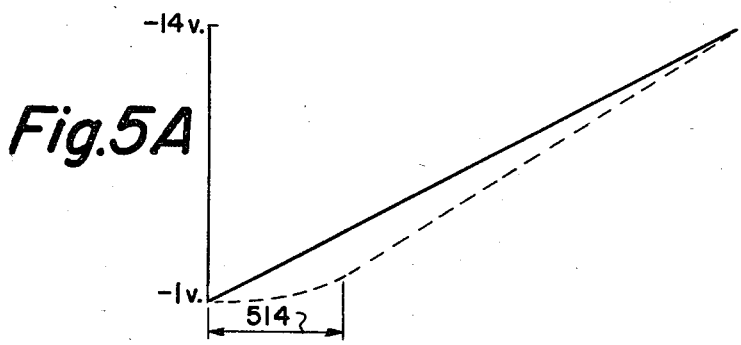
Figure 5B:
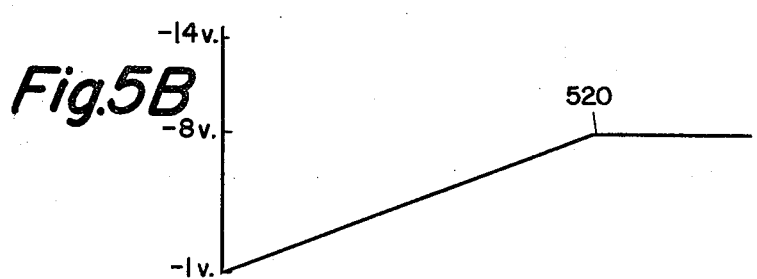
Figure 5C:
Figure 11A:
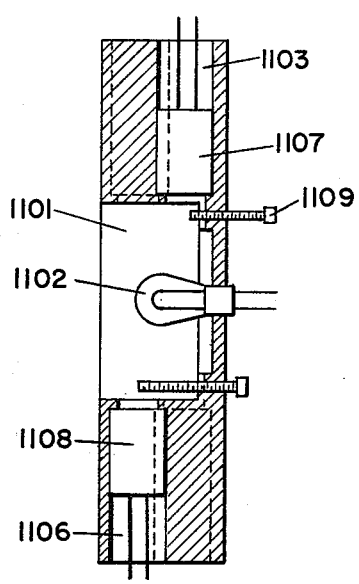
Figure 11B:
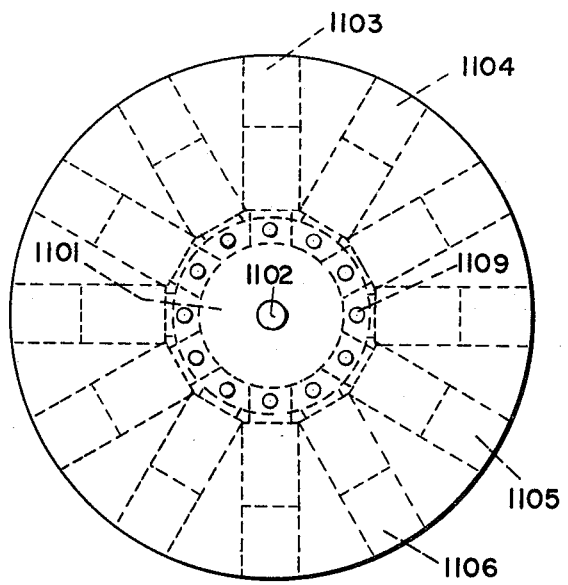
Figure 6:
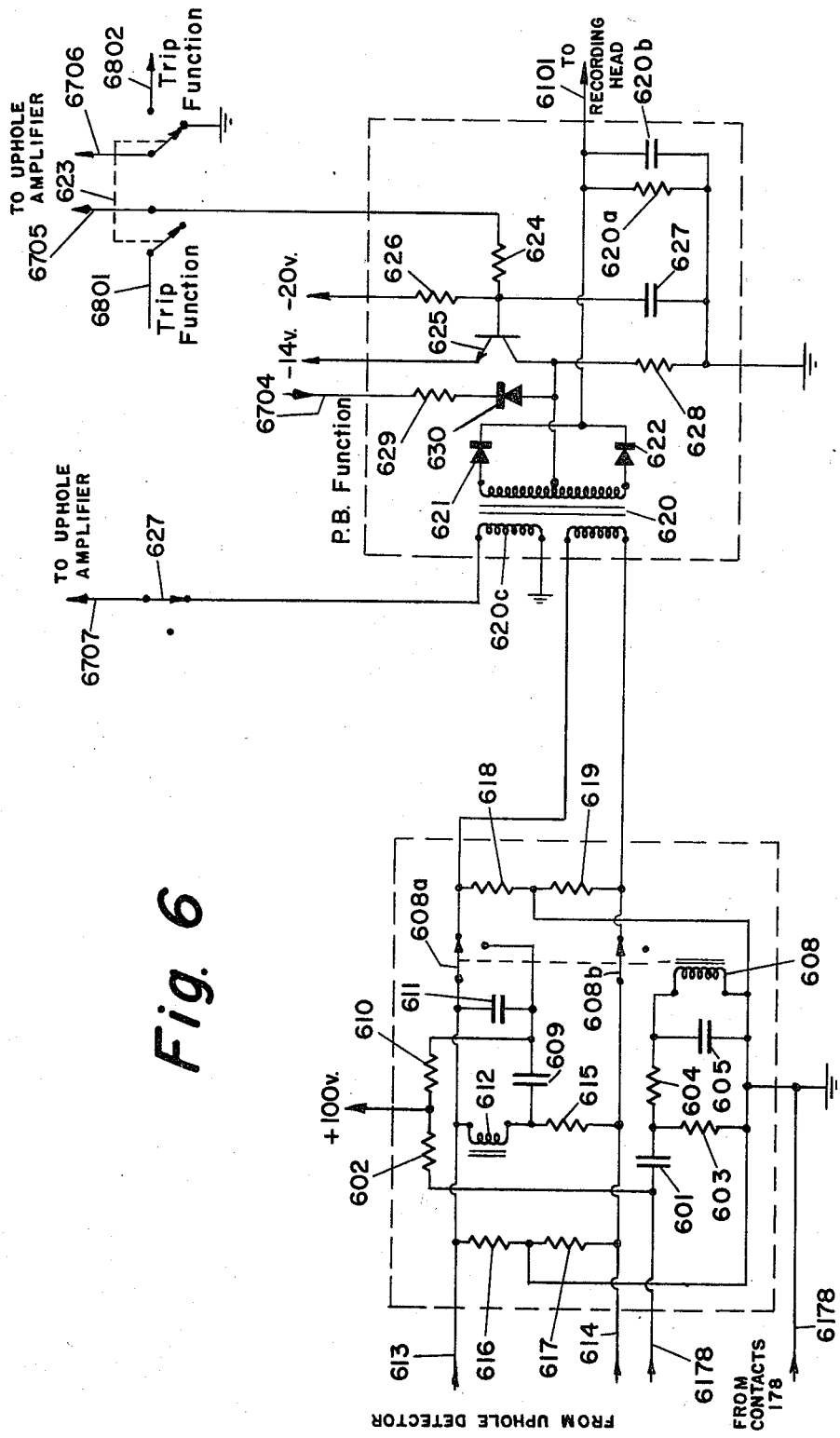
Figure 7:
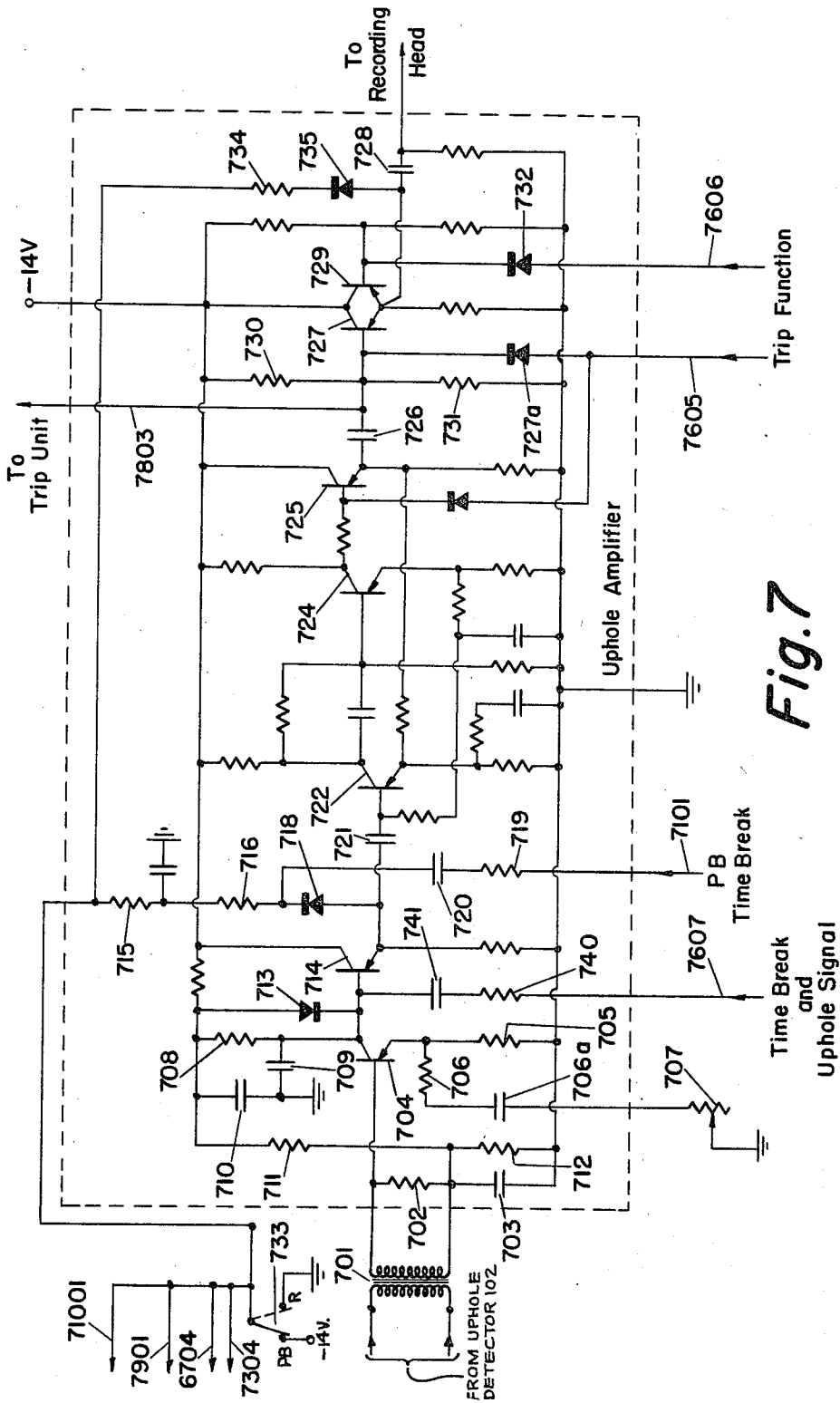
Figure 8:
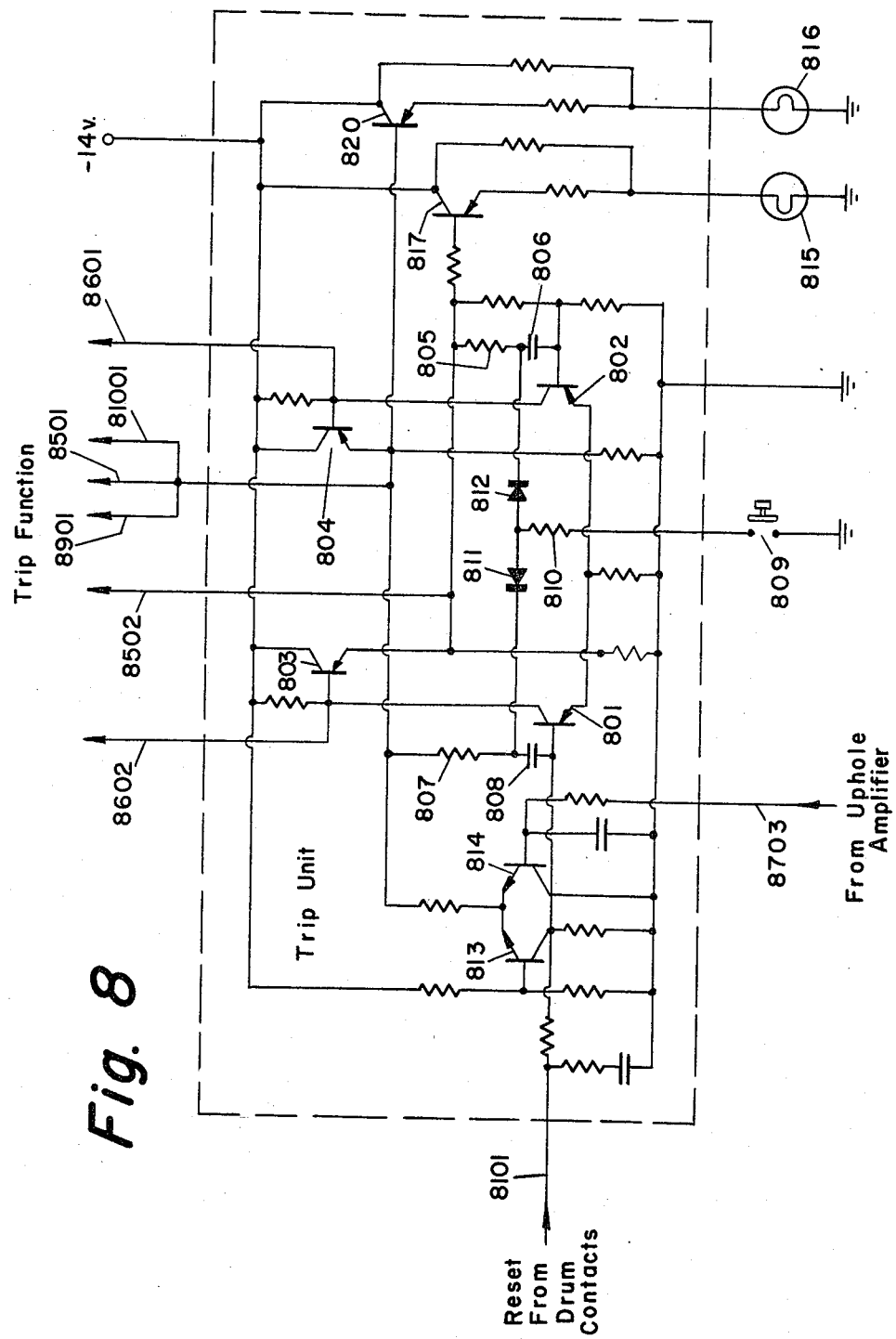
Figure 9:
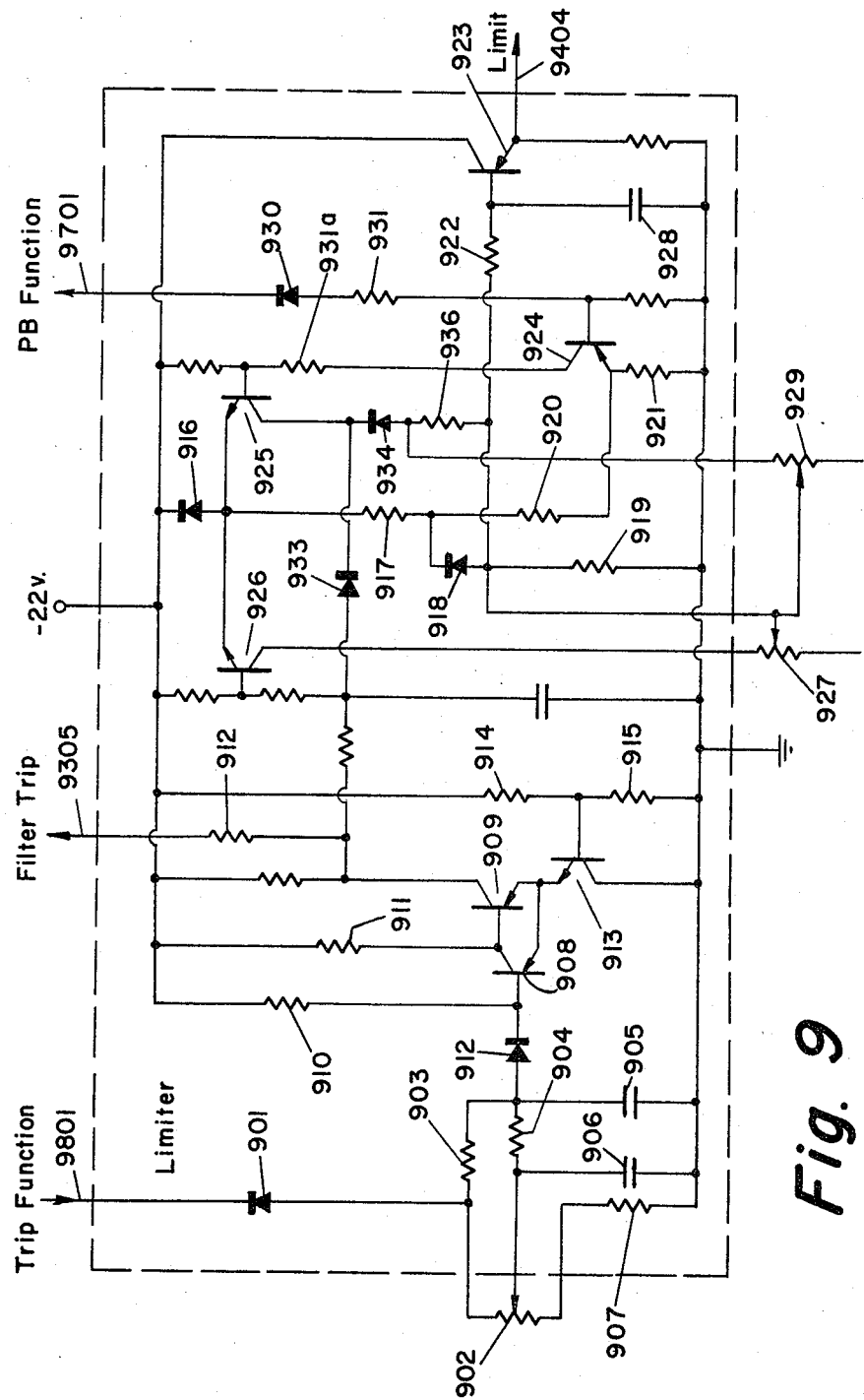
Figure 10A:
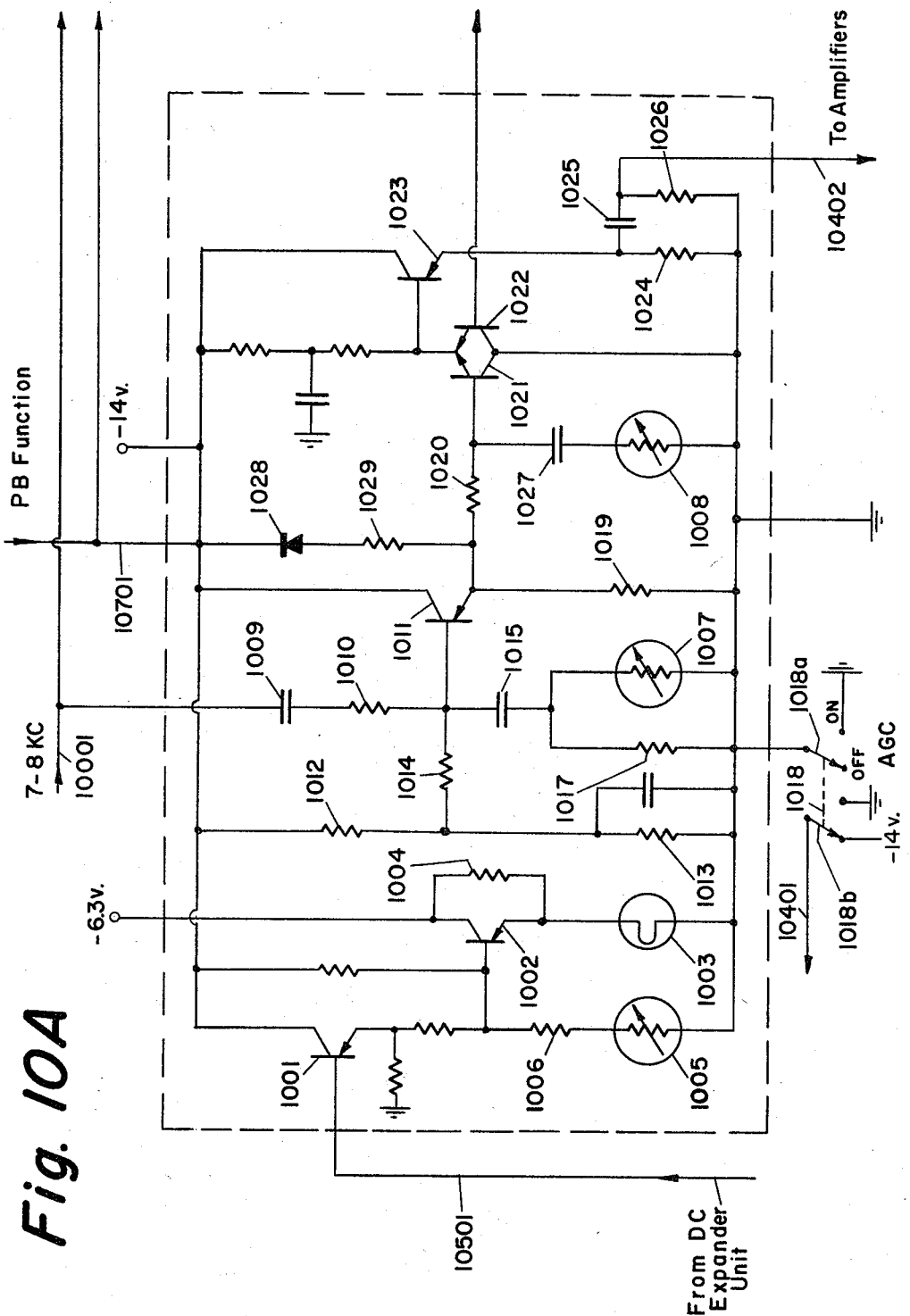

The above and other objects, features and advantages of the present invention will be better understood from the following more detailed description, in conjunction with the appended claims and the drawings in which:

FIG. 1 shows a block diagram of the amplifying system and its relation to the seismic detectors and control unit;
FIG. 2 is a circuit diagram of the preamplifier;
FIG. 3 is a circuit diagram of the filter unit;
FIG. 3A is a circuit diagram of a record filter;
FIG. 3B is a circuit diagram of a playback filter;
FIGS. 4A–4D each show a portion of the circuit diagram of the amplifier;
FIG. 4E shows the manner in which FIGS. 4A–4D fit together to form a circuit diagram of the amplifier;
FIG. 5 is a circuit diagram of the D.C. expander;
FIGS. 5A–5C illustrate different wave forms at different points in the D.C. expander of FIG. 5.
FIG. 6 is a circuit diagram of the blaster trigger;
FIG. 7 is a circuit diagram of the up-hole amplifier;
FIG. 8 is a circuit diagram of the trip unit;
FIG. 9 is a circuit diagram of the limiter;
FIG. 10A is a circuit diagram of the record injection signal unit;
FIG. 10B is a circuit diagram of the playback injection signal unit;
FIG. 10C shows the manner in which FIGS. 10A and 10B fit together to form a circuit diagram of the record injection signal unit and playback injection signal unit.
FIG. 11A is a side sectional view of the lamp and photoresistor housing.
FIG. 11B is a bottom view of the lamp and photoresistor housing.

Each of the circuits in the amplifier system will now be described followed by a short description of the sequence of operations of the amplifier system during a record and during a playback operation.

In the description of the drawings, the following notation will be employed for reference numerals. In describing each of the components, the first number in each reference numeral designates the figure on which the component appears. For example, the first numeral of the reference character 161 is a 1, thereby indicating that this amplifier appears on FIG. 1. In describing leads which interconnect circuitry shown in different figures, the first number of each reference numeral indicates the figure on which the lead appears, and the second number indicates the figure to which or from which the lead is connected. For example, the interconnection between a typical preamplifier, shown in FIG. 2, and a typical filter unit, shown in FIG. 3, includes the output lead 2301, FIG. 2, and the input lead 3201, FIG. 3. The lead numeral 2301 denotes that the lead is on FIG. 2, that the lead goes to FIG. 3 and that the lead number is 01. Similarly, the lead 3201 on FIG. 3 indicates that the lead is on FIG. 3, that the lead comes from FIG. 2 and the lead number is 01.

Referring now to FIG. 1, there is shown a general layout of the geophones and shot-point and the control unit, pre-amplifiers, filters, amplifiers and recording drum which will record seismic information from the geophones.

The setup for producing seismic impulses and for detecting the seismic waves resulting therefrom includes the usual charge of dynamite located in the shot-hole 101. The seismic impulses may also be produced by a device, commonly referred to as a thumper, which repetitively strikes the ground to produce impulses. Also located in the vicinity of the area to be surveyed is the up-hole detector 102 and the geophones 103–127, only the geophones 103, 104, 105 and 127 being shown. Also located in the vicinity of the area to be surveyed is a detonator 128 which is used to set off the charge of dynamite. The detonator 128 may be of the type shown in my United States Patent 3,039,558, issued June 19, 1962. The detonator includes the components indicated by reference numerals 81–111 in that patent.

The equipment which is used to record the seismic traces is generally located at a recording truck located at a distance from the shot-point. This distance may vary from the order of 100 feet to several miles, or greater distance if a radio channel is used to link the area to be surveyed with the recording truck. The area to be surveyed is connected to the recording truck by the channel shown as including lines 129 and 130 and by the cable indicated at 131. The latter cable 131 connects each of the geophones 103–127 to an associated one of the preamplifiers 132–156, the preamplifiers 132, 133, 134 and 156 being shown in FIG. 1. On recording, the output of each preamplifier 132–156 is fed to a filter unit, the filter units 157–160 being shown. The output of each filter is connected through one of the amplifiers 161–164 to an associated recording head on the magnetic recording drum 165 or to any other suitable reproducible medium.

In order to provide the many control functions necessary to the recording of the seismic traces on the drum 165, a control unit 166 is provided. As will be subsequently explained, the control unit provides a signal which varies the intensity of two lamps 167 and 168 which, in turn, vary the conductivity of a plurality of photoresistors contained in a common housing with the lamps 167 and 168. These photoresistors are used to vary the gain of the preamplifiers 132–156. For example, the photoresistors 169 and 170, contained in a common housing with the lamp 168, are used to vary the gain of preamplifier 132 in a programmed manner. Similarly, the photoresistors 171 and 172 are used to control the gain of the preamplifier 133 in a programmed manner. The remainder of the photoresistors associated with the lamps 167 and 168 have not been shown connected to their associated preamplifiers, although it will be understood that each of the preamplifiers 132–156 has associated therewith two photoresistors contained in a housing with one of the lamps 167 and 168.

The control unit 166 also controls the operation of each of the filters 157–160. The control unit 166 acts over the control line 173 to switch either a playback or record filter into the circuit between the preamplifiers and the amplifiers in accordance with whether the unit is recording seismic traces on drum 165 or playing back the traces already recorded on the drum 165. The control unit 166 switches the output of a recording filter to one of the associated amplifiers 161–164 when the system is in the record mode. When the system is in the playback mode of operation, signals picked up, for example, by the pick-up head 174 are connected to a playback filter in the filter unit 157. The control unit 166 acts over line 173 to switch the output of this playback filter to the amplifier 161 when the unit is operating in this mode of operation. In this mode of operation the output of amplifier 161 is connected to the input of a recording device 175, which may, for example, be a recording oscillograph.

The control unit 166 also provides a signal which controls the response time of the automatic gain control circuits (AGC) in each of the amplifiers 161–164. Control unit 166 generates a limit signal on the line 176 which is connected to each amplifier 161–164 to control the response times of automatic gain control circuits.

The control unit 166 also produces an injection signal which, when used in conjunction with automatic gain control, controls the gain of each of the amplifiers 161–164. In certain situations the automatic gain control for each of the amplifiers 161–164 may be disabled and the gain of the amplifiers controlled solely by the injection signal. The injection signal is a 7–8KC signal which, as indicated by line 177, is injected into the front end of each amplifier. The amplitude of the 7–8KC injection signal is detected by feedback circuitry which controls the gain of each of the amplifiers in accordance with the amplitude of the injection signal.

The drum 165 carries a cam which actuates a plurality of switches, such as the switch 178. The switch 178, when closed, initiates the detonation of the charge in the shot-hole 101. When the switch 178 is closed, a detonating impulse is transmitted over the lines 129–130. This impulse is coupled through transformer 179 to actuate the detonator 128. As is best described in the aforementioned Patent 3,039,558, the detonator introduces a time delay. After this time delay an impulse is produced on the lines 180–181 which sets off the charge of dynamite in shot-hole 101. The impulse on lines 180–181 is also coupled through transformer 182 to the lines 129–130. This impulse, referred to as the time-break signal, is transmitted back to the control unit 166 to trip the control unit. When the control unit is tripped, many functions are initiated which act upon the preamplifiers 132–156, filters 157–160, and amplifiers 161–164 for varying their characteristics to record the resulting seismic waves which will be picked up at the geophones 103–127.

The recording and playback equipment which is generally carried on the recording truck and which has been shown in block form in FIG. 1, will now be described in detail.

*Preamplifier, FIG. 2*

The preamplifier shown in FIG. 2 is representative of any one of the preamplifiers 132–156 shown in FIG. 1. The input to the preamplifier is from a geophone to the input transformer 201. In order to develop the proper voltages for operation of the preamplifier, a —14 volt input is dropped down to the proper voltages by the resistors 216, 217 and 218 which are bypassed to ground by capacitors 219, 220 and 221.

The secondary of input transformer 201 is connected across an input attenuator 202. Variable tap 202a picks off the input which is applied to the base of transistor 203. The lower end of input attenuator 202 provides the base bias voltage for the transistor 203. The lower end of input attenuator 202 is connected to the junction of resistors 204 and 205. Resistors 204 and 205 set the operating bias for the base of transistor 203. Resistor 205 is bypassed to a ground by a capacitor 206. The output of transistor 203 is developed across collector resistor 207.

The gain of the transistor 203 is variable by means of a variable emitter circuit. Resistor 208 is the emitter resistor of transistor 203. The impedance of the emitter circuit is variable for A.C. signals. A.C. signals are coupled through capacitor 209 to the variable resistance network including resistor 210 and the photoresistor 211. Resistor 210 and photoresistor 211 are connected in parallel so that as the resistance of photoresistor 211 varies, the A.C. impedance of the emitter circuit of transistor 203 varies. The photoresistor 211 is one of twenty-five photoresistors contained in a common housing with the lamp 501. The light intensity of the lamp 501 is varied in a programmed manner as will be subsequently explained in order to simultaneously vary the gain of all of the preamplifiers, such as the preamplifier shown in FIG. 2.

The gain of a transistor amplifier of the type including transistor 203 is proportional to the ratio of the collector impedance to the emitter impedance. Therefore, as the emitter impedance is caused to vary by changing the resistance of resistor 211, the gain of the transistor amplifier 203 changes. As the resistance of photoresistor 211 decreases, the gain of the transistor 203 increases. The intensity of the lamp 501 is caused to increase with increasing time after shot-time. Therefore, the resistance of photoresistor 211 decreases with time after shot-time thereby increasing the gain of transistor 203. Since seismic signals will have a decreasing amplitude with time after shot-time, it is desirable to increase the gain of the amplifier 203 to compensate for this.

The use of a variable emitter circuit to control the gain of a transistor amplifier has many advantages. In seismic recording the initial signals received are of a high amplitude and may produce a great deal of distortion. In this situation, it is desirable to have a large amount of current feedback from the emitter to the base of transistor 203. As is well known, when the emitter impedance of a transistor amplifier is high, there will be large current feedback from emitter to base, thereby reducing distortion in the amplifier. The photoresistor 211 has a very high impedance during the initial time period of the seismic trace. The intensity of the lamp controlling the resistance of photoresistor 211 is programmed to have a low intensity at this initial time, thereby keeping the emitter impedance of transistor 203 at a high level.

As the time after shot-time increases, inputs of a decreasing amplitude are received at the preamplifiers shown in FIG. 2. These lower amplitude signals will produce less distortion in transistor 203; therefore, less current feedback is desired. As the time after the shot increases, the resistance of photoresistor 211 drops. This drop in resistance of photoresistor 211 decreases the emitter impedance of transistor 203. This decreased emitter impedance effects a reduced current feedback in transistor 203 as is desired.

The variable emitter circuit has a further advantage over an arrangement for varying the gain such as including a variable impedance in the base circuit. When the variable impedance is in the base circuit, the impedance of the base circuit must be high. When a transistor amplifier has a high impedance base circuit, it is much more susceptible to internally generated noise. Therefore, the variable base circuit is not suitable and my variable emitter circuit provides a much more satisfactory control of the gain of a transistor amplifier.

The programmed variation of gain of the preamplifier is desirable when a charge of dynamite is exploded to produce the seismic impulses. When a thumper is employed to produce the seismic impulses, the resultant seismic waves will be of a much smaller amplitude and they will not normally overdrive the first stage of the preamplifier. When using a thumper, it is desirable to allow the first stage of the preamplifier to operate at full gain at all times. For this purpose a switch 212 is provided. The switch is in the position shown when a shot is used to generate the seismic impulses. The switch 212 is switched to its lowermost position when a thumper is used to generate the seismic impulses. In this case the resistor 213 is connected between ground and the emitter bypass capacitor 209. The resistor 213 is of a very low value so that the emitter impedance of transistor 203 is small and the gain of the first stage of the preamplifier is high at all times.

In order to decrease distortion, to increase the collector impedance of transistor 203 and thereby increase the gain of transistor 203 and to improve the performance of subsequent stages, the collector output of transistor 203 is connected to an emitter follower including the transistor 214. The emitter follower 214 includes the usual emitter resistor 215 across which is developed a signal of low impedance and of the same phase as is the signal appearing at the collector of transistor 203.

The signal at the emitter of transistor 214 is coupled through capacitor 222 to the base of the amplifier 223. The amplifier 223 also has a variable impedance emitter circuit for varying the gain. The variable emitter circuit includes a photoresistor 227 whose impedance is varied by the variable intensity of the lamp 501 (FIG. 5). The photoresistor 227 is coupled to the emitter of amplifier 223 by way of conductor 231 and a network including resistors 224, 226 and coupling capacitor 225. The operation in controlling the gain of the transistor 223 is as described in conjunction with the variable emitter circuit of transistor 203.

In order to vary the effect that the photoresistor 227 has on the gain of amplifier 223, a variable resistor 228, commonly referred to as an L-pad type, is provided. The L-pad has a variable resistor arm 229 in series with the photoresistor 227 and a variable resistor arm 230 in parallel with the photoresistor 227. The resistance of both arms 229 and 230 is varied simultaneously. The arms 229 and 230 and arranged so that when the arm 229 is at a maximum resistance, the arm 230 is at a minimum resistance. Under this condition, the photoresistor 227 is shunted by the very low resistance 230. In addition, the high resistance 229 is included in series with the photoresistor 227. Therefore, in this condition changes in the resistance of photoresistor 227 have very little effect on the gain of the amplifier 223. The L-pad is varied so that the resistance of arm 229 decreases and the resistance of arm 230 increases. It can be seen that the resistance of photoresistor 227 has an increasing control over the gain of the transistor 223 as this is done.

The resistance of the arms 229 and 230 are so related that when photoresistor 227 is in its low resistance condition, the gain of the amplifier 223 is the same regardless of the setting of the arms 229 and 230. That is, the impedance at the point 231 is always the same when the photoresistor 227 is in its low impedance condition regardless of the settings of the arms 229 and 230. The purpose of the L-pad 228 is to adjust the gains of the individual amplifier channels. The L-pad 228 adjusts the gain of the amplifier early in the recording cycle but has little effect on the gain late in the recording cycle when the photoresistor 227 reaches its minimum programmed impedance. It is important to be able to control the gain of individual preamplifiers early in the recording cycle because it is during this early portion of the recording cycle that there is the largest variation in amplitude of the signals received at the various geophones. Because of the weathering layer and other near-surface conditions, there will be a large variation in the early returns at each of the geophones. By means of the L-pads such as 228 in each preamplifier channel, it is possible to equalize these early returns among the various preamplifiers without affecting the amplitude of the later arriving seismic waves.

The output of transistor 223 is developed across the collector resistance 231 as is common. The output signal is coupled to the base of the amplifier 232 by means of the parallel combination of resistor 233 and capacitor 234. The voltage divider formed by resistors 233 and 235 sets the operating bias for the base of transistor 232. In order to stabilize the operating characteristics of transistors 223 and 232, negative feedback is provided from the emitter of transistor 232 to the base of transistor 223. The emitter circuit of transistor 232 includes the resistors 235a and 236. The resistor 236 is bypassed to ground by capacitor 327. The feedback is taken from the junction of the resistor 235a and the bypassed resistor 236 in order to prevent A.C. signals from being fed back. The D.C. feedback is connected through resistor 238 to the base of transistor 223.

The output of transistor 232 is developed across collector resistor 239. The signal on the collector of transistor 232 is connected directly to the base of transistor 240. The emitter of transistor 240 provides an output on the lead 2301 which is connected to the input lead 3201 of the filter.

In order to stabilizer the A.C. operating characteristics of the preamplifier, A.C. feedback is provided from the emitter of transistors 240 to the emitter of transistor 223. The output signal developed across emitter resistor 241 is connected through the resistor 242 to the emitter of transistor 223. It is desirable that this A.C. negative feedback be taken from the output stage 240 so that the feedback reduces the distortion introduced by the loop including transistors 223, 232 and 240. This feedback renders the gain of the preamplifiers less dependent upon individual transistor characteristics and less dependent upon temperature conditions.

*Record filter and playback filter, FIG. 3*

During the recording of seismic waves after a shot, it is desirable to filter out low frequency components which are low frequency waves which are trapped near the surface and which have no relation to, and obscure, reflections from deeper interfaces. A record filter is inserted in each seismic channel between the preamplifier and the amplifier for this purpose. The record filter takes many forms and the filters may be interchanged for any particular purpose.

When playing back and re-recording a seismic record, it is desirable to further filter seismic signals to narrow down the frequency range. This has the effect of further reducing unwanted noise components and increasing the signal to noise ratio of the desired seismic signal.

The output of the preamplifier is connected to the input 3201 of a record filter 301. The details of record filter 301 are shown in FIG. 3A. As shown, the record filter includes a series resistor 301a and a constant K section including series capacitors 302 and 303, and the shunt inductance 304. The filter further includes a shunt resistor 305 which terminates the filter in the proper impedance to provide a good impedance match to the filter output.

The playback filter is indicated generally at 306. One suitable playback filter is shown in FIG. 3B. The playback filter shown includes two high-pass sections and two low-pass sections. The input to the filter includes a series resistor 307 for impedance matching purposes. The first high-pass filter includes capacitors 308 and 309 and shunt inductance 310; the second high-pass section includes series capacitors 311 and 312 and shunt inductance 313. The first low-pass section includes the series inductance 314 and shunt capacitors 315 and 316; the second low-pass section includes series inductance 317 and shunt capacitors 318 and 319. The shunt resistor 320 is provided to match the output impedance of the filter to the impedance of the amplifier.

The input to the filter 306 is from one of the playback heads on the recording drum. For example, the input 3122 may be taken from the demodulator associated with the playback head 174 in FIG. 1. If the seismic signals have been recorded digitally on the magnetic drum 165, then the input to the playback filter is from a digital to analog converter connected to the associated playback head.

On playback, it is desirable to pass the first arriving signals unfiltered to the amplifier input. It is desirable to insert the playback filter 306 into the circuit only at a finite interval of time after the time corresponding to shot-time. The signals received between shot-time and the first reflection arrivals are sometimes of a low frequency and contain useful information regarding near surface conditions. However, after the first arrivals, these low frequency signals represent noise and it is desirable to filter them out. In order to do this, the playback filter 306 is by-passed by a circuit including resistors 321 and 322 connected across the playback filter input. The common junction of resistors 321 and 322 is connected to one contact of a relay 323. When the relay contact 323 is in its lowermost position, the playback input at 3122 is connected directly to the output 3403 without filtering. When the relay contact 323 is in its upper most position, the input is filtered before being passed to the amplifier.

A relay 324 is provided to selectively connect either the record filter 301 or the playback filter 306 to the filter output 3403. The relay contact 324 is in its uppermost position in the recording operation and in its lowermost position in the playback operation. The circuitry which actuates the relays 323 and 324 will now be described.

The signal which controls whether the filter unit is in the record or playback condition is generated in the control unit. As will be subsequently described, the playback signal is obtained from a manually operated switch which switches the lead 3704 between −14 volts for playback and ground potential for record. When the lead 3704 is at the record voltage, 0 volts, the transistor 325 is cut off because its base is connected to ground through resistor 326. The input lead 3704 is applied to the base of transistor 325 by means of an isolating diode 327 and base resistor 328. The transistor 325 is connected with transistor 329 so that when transistor 325 is cut off, transistor 329 is cut off, and, conversely, when one transistor conducts, the other transistor conducts. The collector resistors 330 and 331 of transistor 325 have a common point which is connected to the base of transistor 329. Transistor 325 has an emitter resistor 332. The emitters of transistors 325 and 329 are interconnected by means of resistor 333. The common emitter coupling resistor 333 maintains both transistors 325 and 329 in a cut-off condition when the input lead 3704 is at ground potential. In order to establish a cut-off bias for transistor 329, the emitter of transistor 329 is connnected to −14 volts through the diode 334. The collector of transistor 329 is connected through resistor 335 to the windings of the relays such as the relay winding 324a which switches the filter output between the record and the playback filter. Windings 324b–324f are provided for other channels in the system and perform the same function for these other channels. In order to damp out large transients which may appear across the relay windings, a diode 336 shunts the relay windings.

The operation of the transistors 325 and 329 in switching the relay 324 between the record and the playback position is as follows. When ground potential is applied at 3704 as previously mentioned, the transistor 325 is cut off and the base of transistor 329 is maintained at a negative potential thereby maintaining transistor 329 in a cut-off condition. No current is supplied to the relay windings 324a–324f. Therefore, the relay contact 324 is in its deenergized, uppermost, position as shown. When the playback voltage of −14 volts is applied to input lead 3704, the base of transistor 325 goes negative and transistor 325 conducts. A positive-going voltage is applied through the collector resistor 330 to the base of transistor 329 causing this transistor to conduct. When the transistor 329 conducts, current is supplied to the relay windings 324a–324f and the relay 324 is switched to its energized, downward, position.

Current is also supplied to transistor 337 so that it can respond to the filter trip function on the input lead 3905. This signal is at −20 volts during the initial, or reset, portion of the seismographic trace. At a time corresponding to approximately the first returns on the seismic trace, the filter trip function at 3905 is switched to −4 volts. The filter trip function is applied through resistor 338 to the base of transistor 337. When the filter trip function is at the reset potential, the —20 volts maintains the transistor 337 cut off. The common junction of the collector resistors 338a and 339 is connected to the base of a transistor 340. Since the transistor 337 is maintained in a cut-off position, the transistor 340 is also cut off. The emitter circuit of transistor 340 has an emitter resistor 341 which fixes the cut-off potential of that transistor. The emitter of transistor 340 is connected through a resistor 342 to the base of transistor 343.

Resistors 344, 342 and 341 fix the base of the transistor 343 at a more positive potential than that at the emitter of transistor 343 which is connected to —14 volts through the resistor 345. Since the base of transistor 343 is more positive than the emitter, this transistor conducts and supplies current to the bases of transistors 346 and 347 or to the collector of transistor 340. When transistor 340 is maintained in a non-conducting condition because the input lead 3905 is at reset, —20 volt, then current from transistor 343 is supplied to the bases of transistors 346 and 347 maintaining the bases at a negative potential and causing the capacitor 348 to become charged with a negative voltage on the side of the capacitor connected to the common emitters of transistors 346 and 347. When the filter trip function on input lead 3905 switches from the reset to the tripped, —4 volt, condition, the transistor 337 is rendered conducting and the transistor 340 is rendered conducting. The bases of transistors 346 and 347 go more positive, and the capacitor 348 is discharged through the relay windings 323a–323f. The relay 323 is of the magnetic latching type so that an impulse is sufficient to switch the relay to its other condition where it will be maintained until an impulse of the opposite polarity switches the relay back. Relay contacts 323 are in their lowermost position when the input lead 3905 is in the reset, —20 volt, condition and the relay contact 323 is switched to its uppermost position when the input lead 3905 is switched to the tripped, —4 volt, condition.

*Amplifier, FIGS. 4A–4D*

Operating potentials for the transistors in the amplifying unit are provided by dividing the —14 volt voltage down to appropriate levels by means of resistors 405– 408 which are bypassed to ground by the capacitors 409–412.

The output of the filter unit in each channel is connected to the input to an associated amplifier such as that shown in FIGS. 4A–4D. These four figures, when fitted together as shown in FIG. 4E, form a schematic diagram of the amplifier. The input on lead 4303 is coupled through a capacitor 401 to the base of emitter follower 402. The base of transistor 402 is maintained at its operating bias by the resistors 403 and 404. The transistor 402 is an emitter follower, the output of which is developed across the emitter resistor 413.

The voltage on the emitter of transistor 402 is connected through resistor 414, variable photoresistor 415, and coupling capacitor 416 to the base of transistor 417. The photoresistor 415 has a resistance determined by the automatic gain control circuitry to be subsequently described.

The output voltage of transistor 417 is developed across the collector resistor 418 and this voltage is coupled through capacitor 419 to the base of transistor 420. Resistors 418, 421 and 422 set the base operating bias for transistor 420.

The emitter circuit of transistor 420 includes emitter resistors 423 and 424. Resistor 424 is bypassed to ground by capacitor 425. In order to provide voltage feedback from transistor 420 to the transistor 417 and to establish operating potential for the base of transistor 417, a feedback path including resistors 426 and 427 is provided. Resistor 426 is bypassed to ground by capacitor 428.

In order to provide A.C. feedback from transistor 420 to transistor 417, the signal developed across collector resistor 428a is connected through resistor 429 to the emitter of transistor 417. The emitter of transistor 417 is returned to ground through resistors 430 and 431 and capacitor 432.

The output at the collector of transistor 420 is connected through another variable photoresistor 433 and capacitor 434 to the base of transistor 435. The output at the collector of transistor 435 is coupled to the base of transistor 436. Transistors 435 and 436 form an amplification stage similar to that provided by transistors 417 and 420. The circuitry provided to maintain operating voltages and to provide feedback for the transistors 435 and 436 is similar to that described in conjunction with transistors 417 and 420. The output of transistor 436 is connected to the base of emitter follower transistor 437. A.C. feedback to transistor 435 is taken from the emitter of transistor 437. The transistor 437 develops an output voltage across the emitter resistor 438. This output voltage is applied to the base of transistor 443 through resistors 439 and 440. The resistors 439, 440 and capacitors 441 and 442 form a filter which removes the high frequency, 7–8 KC, injection signal from the output of the amplifier. The output of the amplifier is developed across the emitter resistor 444 and is coupled through capacitor 445 to a modulator associated with one of the recording heads on the drum 165.

The output of the amplifier including the injection signal is used to provide automatic gain control for the amplifier. The output signal including the injection signal is developed across the resistor 438 and is connected through resistor 446 to the base of transistor 447. This signal is also applied to a capacitor 448 which passes only the injection signal to the automatic gain control circuitry. The automatic gain control circuitry may be responsive to the injection signal alone coupled through capacitor 448 or may be responsive to the sum of the seismic signal and the injection signal coupled through emitter follower 447 to the AGC circuitry. The selection of these two alternatives is performed by the voltage on lead 41001 which is applied through resistor 450 to the emitter of transistor 447. The AGC on-off signal on lead 41001 is at at ground potential when the AGC is on, and is at —14 volts when the AGC is off. When the AGC is on, lead 41001 at ground potential, the transistor 447 is supplied with emitter potential which allows it to operate as an emitter follower. In this condition, the sum of the seismic signal and the injection signal is connected through emitter follower 447 to the AGC circuitry. However, when the input lead 41001 is at —14 volts, the emitter base junction of transistor 447 is back-biased, thereby preventing this transistor from operating as an emitter follower. In this condition, only the 7–8KC injection signal is coupled through capacitor 448 to the AGC circuitry.

The output of emitter follower 447 is coupled through capacitor 451 and resistor 452 to the input of a push-pull stage including transistors 453 and 454. A base operating potential of approximately —7 volts for the transistors 453 and 454 is provided by the voltage divider including resistors 455 and 456. The junction of these resistors, approximately —7 volts, is connected to the base of transistor 453 by means of resistor 457 and is connected to the base of transistor 454 by means of resistor 458. The emitter of transistor 453 is connected to ground through resistors 459 and 460; the emitter of transistor 454 is connected to ground through resistors 461 and 461a.

In order to provide phase inversion, the emitter of transistor 454 is coupled through capacitor 462 to the junction point of resistors 459 and 460. The capacitor 462 is connected to the junction point of the two resistors 459 and 460 so that there is always a small D.C. potential across capacitor 462. This is necessary since the capacitor is an electrolytic capacitor.

The transistors 453 and 454 act as a push-pull amplifier in converting the input signal at the bases of the transistors to a double-ended output across the output transformer 465. The primary winding of transformer 465 is center-tapped and this center tap is connected to −14 volts. In order to provide feedback to the push-pull amplifier, the resistors 463 and 464 connected across the output of the push-pull amplifier are provided. Any unbalance of the push-pull amplifier will develop a voltage at the junction point of resistors 463 and 464. This junction point is returned to −14 volts through a resistor 466. The unbalance voltage is coupled through capacitor 467 to the base of transistor 454. Any unbalance voltage developed at the junction point of resistors 463 and 464 will act at the base of transistor 454 to correct this unbalance.

The push-pull output taken from the secondary of transformer 465 is rectified in the full-wave rectifier including the diodes 468 and 469. The center tap of the secondary of transformer 465 is returned to ground as is common in full-wave rectifiers. The D.C. control signal at the anodes of diodes 468 and 469 is smoothed by a smoothing filter including resistor 470 and capacitor 471. The control signal is connected through a resistor 472 to the base of an emitter follower 473.

In order to provide a slight delay in the action of the AGC circuit, a capacitor 474 is provided. Capacitor 474 also serves to further filter and smooth the signal. A network including resistor 475 and a capacitor 476 is provided to introduce an action which prevents the amplifier from hunting or oscillating about a stable operating point.

The response time of the AGC circuit is variable. This is often referred to as a variable attack time circuit. In order to introduce this variable attack time, a transistor 477 is provided. The conductivity of transistor 477 is controlled by a limit signal at input lead 4904 which is applied through resistor 478 to the base of transistor 477. The transistor 477 together with its collector resistor 479 provides a variable impedance between the common anodes of diodes 468 and 469 and the base of transistor 473. This variable impedance circuit controls the time required to charge capacitor 474 to the proper voltage which determines the level of AGC. As the conductivity of transistor 477 increases, the voltage across capacitor 474 will follow the input to the AGC circuitry more quickly. This is referred to as a fast attack time. Conversely, as the conductivity of transistor 477 decreases, the voltage developed across capacitor 474 will follow more slowly the input to the AGC circuitry.

In seismic recording it is desirable to provide the amplifier with a fast attack time during the initial portions of the trace. The fast attack time is desirable to bring the initial returns, which may be quite high, down to a level which is suitable for recording by means of AGC action. However, during the latter portions of the trace, these high amplitude transients usually are not present. During the latter portions of the trace, it is desirable to delay the AGC action by providing a slower attack time in order to prevent the introduction of distortion which may be introduced by using an AGC circuit which acts too quickly to smooth out the amplitude of the received seismic signals.

This variable attack time is introduced into the amplifier of FIG. 4 by means of the limit signal on lead 4904. The limit signal at input 4904 maintains the transistor 477 conductive during reset time and the transistor is maintained in this condition until a predetermined time after shot-time, at which time the limit signal on input lead 4904 goes negative thereby rendering the transistor 477 less conductive and lengthening the attack time of the AGC circuit.

It is desirable in AGC circuits to provide a fast release circuit so that the voltage across the capacitor 474 will closely follow changes in the AGC voltage. The release circuit including resistor 480 and transistor 481 is provided for this purpose. When the voltage at the base of transistor 481 becomes more positive than the voltage across capacitor 474, the transistor 481 conducts to make the voltage across capacitor 474 closely follow the signal at the anodes of diodes 468 and 469 when this signal is becoming more positive.

The AGC signal at the emitter of transistor 473 is connected through resistor 482 to the base of transistor 483. The collector of transistor 483 is connected through resistor 484 to the base of transistor 485. Transistor 485 is an emitter follower which supplies the current controlling the intensity of the lamp 486. The intensity of the lamp 486 controls the resistance of photoresistors 415 and 433 as is indicated by the dashed lines interconnecting lamp 486 and photoresistors 415 and 433. The resistance of photoresistors 415 and 433, in turn, control the gain of the amplifier.

The response time of the AGC circuit is much faster when the intensity of lamp 486 is low. In this case small changes in the voltage applied to the lamp 486 will cause a large percentage change in the gain of the amplifier. A circuit is provided to compensate the attack time so that it is more nearly equal over the entire range of intensity of the lamp 486. In order to accomplish this, a feedback path is provided from the junction of resistors 484 and 487 to the base of transistor 483. This feedback path includes the diode 488 and the resistor 489. The potential at the cathode of diode 488 is set by the resistor network including resistors 490, 491, and 492. This voltage is such that the diode 488 will not conduct when voltage at the anode of diode 488 is high, resulting in a high intensity for lamp 486. However, when the voltage at the junction of resistors 484 and 487 is low, resulting in a low intensity for lamp 486, then the anode of diode 488 is at a potential lower than that set at the junction of resistors 490 and 492. In this condition, the diode 488 conducts, thereby decreasing the gain of transistor 483. This decrease in gain is brought about by two factors. First, the collector resistance of 483 is decreased by reason of the resistor 487 being shunted by the path including diode 488 and resistor 492. Second, there is feedback from the collector of transistor 483 through diode 488 and resistor 489 to the base of transistor 483 which serves to decrease the gain. This condition exists when the intensity of lamp 486 is low.

When the intensity of lamp 486 is high, a condition brought about by a small AGC signal, then the signal developed at the junction of resistors 484 and 487 is more negative than the set voltage at the cathode of diode 488. In this condition, the diode 488 is back-biased and the transistor 483 is in its full gain condition.

In order to compensate for the temperature characteristics of transistor 485 and diode 488, a temperature responsive resistor 493 is provided. This temperature responsive resistor 493 is connected between the cathode of diode 488 and ground. The temperature responsive resistor 493 changes the voltage level set by the resistors 490, 491 and 492. By changing this level slightly with temperature, the voltage at which the diode 488 becomes conductive changes. The gain of the amplifier 483 changes slightly with temperature and changes in a direction to compensate for temperature drift of transistor 485 and diode 488.

In order to further control the gain of the amplifier of FIG. 4, an injection signal is inserted into the amplifier ahead of the first gain control stage. The amplifier reacts to this injection signal in the same manner as it would to a seismic signal. The injection signal, 7–8KC, is present on the lead 41002. The signal is applied through resistor 494 and capacitor 495 to the junction of resistors 414 and 415. When the injection signal has a large amplitude, the AGC circuitry responds to this large amplitude signal by decreasing the gain of the amplifier. Conversely, when the injection signal has a small amplitude, the AGC circuitry produces a small AGC signal which results in the amplifier having a larger gain.

In seismic recording, it is desirable to program the gain of the amplifier so that the amplifier has a small gain initially and a larger gain during later portions of the seismic record. Since the initial seismic returns are always quite large, the amplifier should have a small gain during these initial times. In order to accomplish this, the injection signal on lead 41002 is quite large initially and decreases to a smaller amplitude as time after shot-time increases.

*Control unit*

The control unit performs many functions relating to the control and operation of the preamplifiers, filters and amplifiers both during a recording and a playback operation. Each of these functions will be described separately below.

*Blaster trigger, FIG. 6*

The circuitry shown in FIG. 6 is provided to apply a detonating pulse to the lines 129–130, FIG. 1. It is desirable to detonate the charge in the shot-hole 101 at a definite time with relation to the movement of the drum 165 beneath the recording heads. This is desirable so that the initial shot-time will always occur at a particular position with respect to the splice of the tape on the drum 165. For this reason, the detonation of the charge in the shot-hole 101 is initiated by the contacts 178 which are closed by the movement of the drum 165. The leads across the contacts 178 are connected across the input 6178 in FIG. 6. When the contacts 178 are closed, a capacitor 601, which has been charged through resistor 602, is discharged through a relay circuit including resistor 604, capacitor 605, and relay coil 608. When relay coil 608 is energized, the contacts 608a and 608b are moved to their lowermost positions. When relay contacts 608a and 608b are in their lowermost positions, the capacitor 609, which has been charged through resistor 610, is now connected to inductance 612 to provide a ringing circuit. When this ringing circuit is energized, a pulse is applied to the lines 613–614 which are connected to the lines 129–130 in FIG. 1. A resistor 615 completes the circuit between the ringing circuit and the lines 613–614. Resistors 616, 617, 618, and 619 are provided to complete the charging circuit for capacitor 609. As described in the aforementioned U.S. Patent 3,039,558, when the detonating pulse is transmitted over the lines 129–130, it energizes the detonator 128 which, after a suitable time delay, explodes the charge in the shot-hole 101. Before the expiration of this time delay, the signal in the ringing circuit including capacitor 609 has dissipated, capacitors 601 and 605 have discharged, and relay 608 has relaxed, thereby releasing the relay contacts 608a and 608b to their upper most position. When in this position, a circuit is complete to receive the time break signal over the lines 613–614. When the detonator 128 explodes the charge in the shot-hole 101, a time break signal is coupled through transformer 182 and is applied over lines 129–130 and lines 613–614 through relay contacts 608a and 608b to the input transformer 620. The time break signal is coupled through transformer 620 to the output lead 6101 which is connected to a modulator associated with one of the recording heads on drum 165. In this manner the time break signal is recorded on a seismic trace. The time break signal on lead 6101 is commonly applied to a viewing screen, or camera, so that the operation can be observed by the operators performing the recording.

To insure that a time break signal of a single polarity will be applied to the lead 6101 regardless of the connection of the lines 613–614, the time break signal from the secondary of transformer 620 is applied to a full wave rectifier including the diodes 621 and 622. Regardless of the polarity of the pulse applied to the primary of transformer 620, only a positive pulse will be coupled through either diode 621 or 622 to the output lead 6101. In order to shape the time break signal to make it more suitable for use in some recorders, a shaping network including resistor 620a and capacitor 620b is provided.

It is usually desirable to squelch the circuit providing the time break signal on the output lead 6101 after the time of occurrence of the time break signal. Often, the time break is recorded on the same trace which carries one of the seismic signals. Therefore, after the occurrence of the time break signal, it is desirable to squelch the time break circuit so that it will not pick up extraneous noise which will appear on this trace.

In order to do this, a manual switch 623 is provided. When the switch 623 is manually set in the upper position, the squelch is automatically provided a predetermined interval after shot-time by means of the trip function applied to lead 6801. The trip function voltage applied to lead 6801 is normally −13 volts during the reset condition. A short time after shot-time the trip function appearing on input lead 6801 switches to −1 volt. The trip function is connected through a resistor 624 to the base of transistor 625. The transistor 625 is maintained non-conducting during reset time by the −13 volt trip function applied through resistor 624, and by −20 volts applied through resistor 626 to the base of transistor 625. The transistor 625 remains non-conductive until after the occurrence of the time break signal. When the trip function switches from −13 volts to −1 volt, the transistor 625 is rendered conductive. This applies a negative voltage to the center tap of transformer 620; the diodes 621 and 622 are back-biased and the time break circuit is effectively squelched. Thereafter, extraneous noise will not pass the diodes 621 and 622. In order to delay the squelch action slightly, a capacitor 627 is connected between the base of transistor 625 and ground. This capacitor merely smooths the leading edge of the trip function transition. Transistor 625 is provided with collector resistor 628 connected to ground.

It is also desirable to squelch the time break circuit during a playback operation so that extraneous signals coming in over the lines 613–614 will not be recorded. In order to do this, the playback function voltage is connected over input lead 6704. This function, which is ground potential during record and −14 volts during playback, is connected through resistor 629 and diode 630 to the center tap of transformer 620. During record, the playback function is at ground potential; therefore, the diodes 621 and 622 are conducting so that the time break signal may be recorded. However, during playback the playback function applied to lead 6704 is −14 volts. This −14 volts back-biases diodes 621 and 622 thereby squelching the time break circuit.

*Up-hole amplifier, FIG. 7*

When conditions permit, the up-hole detector 102 is connected directly to the input transformer 701 of the up-hole amplifier. As will be subsequently explained, often it is not feasible to lay an extra cable directly connecting the up-hole detector 102 to the up-hole amplifier of FIG. 7. In this situation, a single cable, the cable 129–130 of FIG. 1, is used and the up-hole signal is brought in through the blaster trigger, FIG. 6, after the recording of the time break signal.

The secondary of the input transformer 701 is terminated in a resistor 702 which is bypassed to ground by capacitor 703. The input signal is applied to the base of transistor 704 which has a variable emitter circuit to control the gain of the amplifier. The emitter is returned to ground through emitter resistor 705. In order to control the A.C. gain, the emitter is also coupled through resistor 706, capacitor 706a and variable resistor 707 to ground. By varying the variable resistor 707, the gain of the transistor 704 may be changed. The collector circuit of transistor 704 includes collector resistor 708 and capacitors 709 and 710. In order to set the base operating bias, the resistors 711 and 712 are provided. In order to clip extraneous noise pulses which might trigger the trip level during playback, the diode 713 is connected to the collector of transistor 704.

The output signal appearing at the collector of transistor 704 is applied directly to the base of emitter follower 714. During playback the output of transistor 714 is squelched by means of the playback function voltage. This voltage is obtained from the manual switch 733, which is in the left-hand position for playback and the right-hand position for record. The playback function is −14 volts during playback and ground potential during record. The function is applied through resistors 715 and 716 and the diode 718 to the emitter of transistor 714. During playback the emitter of transistor 714 is clamped at a voltage more negative than the base of transistor 714.

During playback the time break signal is inserted into the up-hole amplifier through the diode 718 which is back-biased during the record operation but is rendered conducting by the −14 volts applied through resistors 715 and 716 during playback. On playback, the time break signal is taken from one of the demodulators coupled to a recording head on drum 165. For example, the time break signal may be obtained from the playback head 174. The time break signal is applied to the input lead 7101 which is connected through resistor 719, capacitor 720, diode 718 and capacitor 721 to the base of transistor 722. The transistor 722 provides amplification. Transistors 724 and 725 are part of a voltage amplifier and an emitter follower, respectively. The operation of the transistors 722, 724 and 725 is similar to the operation of the amplification stage including transistors 223, 232 and 240 described in conjunction with the preamplifier of FIG. 2.

The time break signal, or the first return detected by the up-hole amplifier, is coupled through capacitor 726 to the output lead 7803 to the trip unit. The time break signal, or the first return detected by the up-hole amplifier, acts over lead 7803 to trip the trip unit, as will be subsequently described. The up-hole signal also is normally coupled through emitter follower 727 and capacitor 728 to the recording head on drum 165 which will record the up-hole signal.

In order to squelch the up-hole signal after the first returns are received, a transistor 729 and associated circuitry are provided. Normally, the base operating bias for transistor 727 will be set by the resistors 730 and 731. However, the trip function, which appears on the input lead 7505 and is applied to diode 727a, changes the operating bias on the base of transistor 727. When the unit is tripped by the time break signal or by the reception of the first return, the trip function on line 7505 goes from −13 volts to −1 volt. When this occurs, the base emitter junction of transistor 727 is back-biased and the transistor 727 no longer acts as an emitter follower. A second trip function, having the same timing but different voltage levels, is applied over the input lead 7606 and the diode 732 to the base of transistor 729. This trip function is −1 volt during reset and −13 volts, after trip time. When the input on lead 7060 goes to −13 volts, the diode 732 is back-biased. The base of transistor 729 goes to approximately −6 volts and is clamped there. This clamps the emitter of transistor 729, as well as the emitter of transistor 727, at approximately 6 volts.

During playback, when the switch 733 is switched to the left-hand position, a −14 volt potential is applied through resistor 734 and diode 735 to further clamp the output of the up-hole amplifier to prevent any extraneous signals from the up-hole amplifier from interfering with the playback operation.

When only a single cable is available between the blaster location and the recording truck, it is desirable to bring the up-hole signal and the time break signal to the recording truck on the single cable. In this case, the up-hole signal is brought in through the blaster trigger, FIG. 6, and, more particularly, through the lines 613–614 and through the transformer 620. In this case, the switch 627 is set to its right-hand position so that the time break, and the up-hole signal, is coupled from the secondary 620c of transformer 620 and through the switch contacts 627 to the output lead 6707 which connects the time break and the up-hole signal to the up-hole amplifier.

The up-hole, or time break, signal appearing on leads 6707 and 7607 is applied through resistor 740 and capacitor 741 to the base of transistor 714. The time break and the up-hole signal are then amplified by the remaining amplifying stages of the up-hole amplifier as just described.

*Trip unit, FIG. 8*

In order to generate a trip function when the first returns from the up-hole amplifier or the time break signal are received, the trip unit shown in FIG. 8 is provided. The trip unit receives the time break and the first up-hole return on the input lead 8703. This signal triggers a bistable flip-flop from a reset condition to a trip condition. The bistable flip-flop includes transistor 801, which is normally conducting when the flip-flop is in the reset condition, and transistor 802, which is non-conducting when the flip-flop is in the reset condition. Emitter followers 803 and 804 are provided in order to provide a low impedance output from either stage of the flip-flop when its potential changes in a negative-going direction. The emitter followers 803 and 804 are connected respectively to the collectors of transistors 801 and 802. The emitter of transistor 803 provides an output on lead 8592 which is at −1 volt when the flip-flop is in the reset condition and at −13 volts when the flip-flop is in the tripped condition. The emitter follower 804 provides an output on the leads 8901, 8501, and 81001 which is at −13 volts when the flip-flop is in the reset condition and at −1 volt when the flip-flop is in the tripped condition. The output 8601 switches between the same voltage levels, that is, −13 volts on reset and −1 volt when the flip-flop is tripped. Similarly, the output lead 8602 switches between a −1 volt level when reset and a −13 volt level when the flip-flop is tripped. These outputs are low impedance when the voltage levels change in a positive-going direction by reason of the clamping action provided by transistors 801 and 802.

The flip-flop including the transistors 801 and 802 is of conventional design including cross-coupling from collector to base to effect a regenerative action when the flip-flop is switched. The collector of transistor 801 is coupled through emitter follower 803, resistor 805, and capacitor 806 to the base of transistor 802. Similarly, the collector of transistor 802 is coupled through emitter follower 804, resistor 807, and capacitor 808 to the base of transistor 801.

In order to manually switch the flip-flop from one condition to another, the manual trip reset button 809 is provided. When this button is depressed, ground potential is applied through resistor 810 to the diodes 811 and 812. When the flip-flop is in the reset condition, transistor 801 is conducting and transistor 802 is cut off, the positive-going potential applied to the anodes of diodes 811 and 812 will pass through diode 811 and capacitor 808 to the base of transistor 801 to cut transistor 801 off. The pulse resulting from closing trip reset switch 809 will have very little effect on transistor 802. After the transistor 801 is cut off, the negative-going potential at the collector of transisor 801 is coupled to the base of transsistor 802 to turn that transistor on. The effect is regenerative because of the cross-coupling so that transistor 801 is cut off and the transistor 802 is rendered conducting. The flip-flop is now in the tripped condition.

The next time that the manual push button 809 is depressed, the transistor 802 will be cut off and the transistor 801 will be rendered conducting to place the flip-flop back in the reset condition.

Automatic tripping of the flip-flop is preformed by the signal from the up-hole amplifier applied over lead 8703. During the reset interval a transistor 813 is conducting and a transistor 814, having a common emitter with transistor 813, is cut off. When the input lead 8703 goes positive, caused by the first return from the up-hole detector or by the time break signal, the transistor 814 will be rendered conducting. When the signal on lead 8703 becomes more positive than the emitter of transistor 814, transistor 814 is rendered conducting, and the transistor 813 is cut off because of the common emitter coupling. When transistor 813 is cut off, its collector goes positive. The collector of transistor 813 is connected directly to the base of transistor 801. Therefore, when transistor 813 is cut off, the transistor 801 is cut off, thereby switching the flip-flop from the reset to the trip condition, as previously described.

Automatic reset of the flip-flop is provided. It is desirable to automatically reset the flip-flop when the drum 165 is set into motion prior to a recording. Therefore, a set of contacts similar to the contacts 178 are closed just prior to the initiation of the recording event. This set of contacts is connected to input lead 8101. When the contacts are closed, a negative voltage is applied to the lead 8101 which renders the transistor 801 conducting, thereby resetting the flip-flop. Before detonation time, the contacts connected to input lead 8101 are opened so that the flip-flop can be tripped upon the occurrence of the first time break signal.

In order to provide a visual indication of the condition of the flip-flop in the trip unit, indicating lamps 815 and 816 are provided. Indicator lamp 815 is driven by emitter follower 817, the base of which is connected to the emitter of transistor 803. The indicator lamp 816 is driven from the emitter follower 820, the base of which is connected to the emitter of transistor 804. When the flip-flop is in the reset condition, emitter follower 820 is conducting and the lamp 816 is on. When the flip-flop is in the tripped condition, the emitter follower 817 is conducting and the lamp 815 is energized.

*D.C. Expander, FIG. 5*

In order to generate the programmed voltage which varies the intensity of a lamp 501 to control the gain of a plurality of the preamplifier units, the D.C. expander shown in FIG. 5 is provided. The basic wave form which is shaped to provide the programmed variation of light intensity of the lamp 501 is generated by discharging the capacitor 502 at a constant rate through transistor 503, resistors 504 and 505 and one of the resistors in the unit 506 to −22 volts.

Initially, when the trip unit is in the reset condition, the voltage at the lead 5802 is at −1 volt and the transistor 507 is turned on, thereby charging the capacitor 502. The capacitor 502 is charged to a voltage determined by the setting of the potentiometer 508. The wiper of the potentiometer 508 picks off a voltage which is applied through diode 509 to the base of transistor 507. Transistor 507 acts as an emitter follower to charge the capacitor 502 to the selected voltage.

At a predetermined time after shot-time, and upon the occurrence of the time break or the first return from the up-hole amplifier, the trip unit is tripped and the trip function switches voltages. The trip function at input lead 5801 goes from −13 volts to −1 volt and the trip function applied to input lead 5802 goes from −1 volt to −13 volts. The switch in the voltage at input lead 5802 renders the transistor 507 non-conductive.

The capacitor 502 now discharges through transistor 503, resistors 504 and 505, and one of the selected resistors in the unit 506 to provide a linear wave form at the base of transistor 509. The linear wave form, which would normally appear at the base of transistor 509, is as shown in FIG. 5A.

It is often desirable to delay the initial portion of the the linear wave form so that the wave form at the base of transistor 509 more nearly approximates the dotted wave form in FIG. 5A. Under certain conditions the initial seismic returns do not decay quite so fast and it is desirable to delay the increase in gain of the preamplifiers to a time when the seismic returns begin to decrease in amplitude.

For example, in certain cases, the geophones are spaced very close to the shot-point. In this case, it is desirable to very quickly increase the gain of the amplifier after shot-time. However, when the geophones are spaced a large distance from the shot-point, it is usually desirable to delay the change in the gain of the preamplifiers; that is, to delay the expander voltage, as indicated by the dotted wave form in FIG. 5A.

This is accomplished by using the trip function voltage applied to input lead 5801 to modify the discharge characteristics of the circuit, including the transistor 503, and resistors 504 and 505, and the selected resistor in the unit 506. The trip function voltage is coupled through a capacitor 510 to the junction of resistors 504 and 505. The expander voltage delay is determined by the setting of the potentiometer 511 and the selection of the resistor from the unit 512, which is connected in circuit between ground and capacitor 510. Normally, in reset condition, the diode 513 conducts and the capacitor 510 is charged to approximately the −13 volt level of the trip function at lead 5801. However, when the trip function at lead 5801 switches to −1 volt, the diode 513 is back-biased thereby permitting the capacitor 510 to discharge to the voltage determined by the setting of the potentiometer 511 and resistor unit 512. This exponential decay in the charge on capacitor 510 affects the discharge rate of capacitor 502 so that the wave form of FIG. 5A is modified to that of the wave form shown in dotted lines on FIG. 5A. It will be appreciated that the delay on FIG. 5A denoted as the time 514 can be varied to any suitable delay by changing the potentiometer 511 and the resistance unit 512.

The wave form of FIG. 5A is applied to the base of emitter follower 509 which couples the signal to the base of the transistor 515.

Often, it is desirable to further modify the wave form of FIG. 5A so that the expansion wave form does not turn the preamplifiers up to full gain. This is accomplished by means of the potentiometer 516, resistor 517, and resistor 518 which set the maximum voltage to which the emitter of transistor 509 may go. For example, if it is desirable to limit the expander voltage to −8 volts, as shown in FIG. 5B, instead of allowing it to go all the way to the −14 volts, as in FIG. 5A, then the potentiometer 516 is set so that the voltage at the junction of resistors 517 and 518 is approximately −8 volts. When the emitter of transistor 509 goes more negative than −8 volts, the diode 519 conducts thereby clamping the emitter of transistor 509 at −8 volts. This occurs at the point marked 520 in FIG. 5B.

The expander voltage taken from the emitter of emitter follower 515 is applied through resistor 516 to the base of transistor 517a. Transistor 517a is an emitter follower which applies the programmed expander voltage to the lamp 501. The intensity of the lamp increases with the increasing expander voltage, thereby increasing the gain of each of the 12 preamplifiers having photoresistors 211 and 227 positioned in proximity to lamp 501.

In order to further modify the programmed intensity of the lamp 501, feedback is provided by means of the photoresistor 518 positioned in proximity to the lamp 501. The photoresistor 518 applies a varying voltage through resistor 519a to the base of transistor 517a. The feedback provided by the photoresistor modifies the expander voltage wave form from that shown in FIG. 5B to that shown in FIG. 5C. It is desirable to vary the gain of the preamplifiers in accordance with the curve shown in FIG. 5C because of the very rapid decay in the received seismic signals after shot-time. Therefore, it is desirable to have the preamplifiers operating at very low gain initially, but have this gain increase very rapidly initially. After this very rapid initial increase of gain, it is desirable that the gain level off and remain relatively constant, only increasing slightly with time thereafter.

When the intensity of the lamp 501 is to be changed over a very small range, such as in the subject embodiment, it is quite difficult to accurately define this range. The temperature characteristics of the transistors are such that the range of intensity of the lamp 501 will vary considerably with the temperature. The feedback from the photoresistor 518 to the base of the transistor 517a makes it possible to accurately calibrate the desired operating range of intensity of the lamp 501 irrespective of temperature variations of the circuit components.

*Limiter, FIG. 9*

In order to produce the limiter voltage which changes the attack time of the AGC circuits in the amplifiers, the circuitry shown in FIG. 9 is provided. On playback, the circuitry of FIG. 9 also produces a filter trip signal which is used to switch the played back signal between a direct connection to the output and a circuit which includes the playback filter. The filter trip signal at the output lead 9305 occurs an adjustable period of time after the transition in the trip function voltage at the lead 9801. Similarly, the limit signal on output lead 9404 occurs an adjustable period of time after the transition in the trip function. This period of time is determined by the limit and filter timing circuit.

The limit function wave form is initiated by the trip voltage applied to input lead 9801. This voltage is at −13 volts in the reset condition and switches to −1 volt when the trip unit is tripped. The voltage transition from −13 volts to −1 volt is coupled through isolating diode 901 to the timing circuit which sets the limit and filter time constant. This circuit includes potentiometer 902, resistor 903, resistor 904, capacitor 905, capacitor 906 and resistor 907.

When the trip function at lead 9801 is in the reset condition, −13 volts, the diode 901 is conducting and the capacitors 905 and 906 are charged. When the trip function on lead 9801 goes from −13 volts to −1 volt, the diode 901 is back-biased, thereby allowing the capacitors 905 and 906 to be discharged through the circuit including the potentiometer 902, and the resistors 903, 904 and 907. The time of discharge is determined by the setting of the potentiometer 902. The voltage wave form developed across the capacitor 905 controls the time at which the conducting states of transistors 908 and 909 will be switched, thereby producing a filter trip signal on output 9305. Normally, the transistor 908 is conducting and the transistor 909 is non-conducting when the operating bias of transistor 908 is set by the resistors 910 and 911. However, when the potential across capacitor 905 becomes more positive than the operating bias applied to the base of transistor 908, then the diode 912 becomes conducting and the transistor 908 is cut off. When transistor 908 is cut off, the collector of transistor 908 goes negative and the transistor 909 is rendered conducting. When transistor 909 conducts, the collector acts through resistor 912 to change the voltage on output lead 9305 from −20 volts to −4 volts. The voltage on the output lead 9305 is used to switch the playback filter unit into the circuit as described in conjunction with FIG. 3.

In order to set the operating point at which the transistors 908 and 909 will switch conducting states, a transistor 913 is provided. The operating point is determined by the resistors 914 and 915, the common point of which is connected to the base of transistor 913. The emitter of transistor 913 is connected to the emitters of 908 and 909 and the voltage at these common emitters determines the point at which the transistors 908 and 909 will switch conducting conditions.

During a recording operation a delayed limit function occurs at the output lead 9404 to change the attack time of the AGC circuit in the amplifier a predetermined time after shot-time. In a recording operation, the limiter voltage at the output lead 9404 is determined by the voltage divider including diode 916, resistor 917, and resistors 920 and 921 in parallel with diode 918 and resistor 919 when the trip unit is in the reset condition. The voltage at the junction of diode 918 and resistor 919 is applied through resistor 922 to the output emitter follower 923. In the record mode, the transistors 924 and 925 are cut off and do not affect the limiter voltage appearing at output lead 9404.

In the reset condition the transistor 926 is cut off. However, at the transition in the trip function voltage, the transistors 908 and 909 switch conducting conditions thereby producing a positive-going voltage at the base of transistor 926. This transistor is rendered conducting. When this occurs, the limit voltage at the output lead 9404 is determined by the voltage divider including the diode 916, transistor 926, potential divider 927 and resistor 919. In this condition, the diode 918 is back-biased so that the potential divider previously effective to set the limiter voltage is no longer effective. In this condition, the voltage at the junction of the potential divider 927 and resistor 919 is applied through resistor 922 to the base of output emitter follower 923.

The limit voltage at the output lead 9404 changes from −7 volts at reset to, for example, −9.8 volts after the limit voltage switches. The voltage to which the output switches is adjustable by means of the potential divider 927. This voltage may be continuously varied within the range −9.8 volts to −20 volts, to provide any desired attack time for the AGC circuits in the amplifiers.

In order to smooth out the transition in the limit voltage, the capacitor 928 is provided at the base of emitter follower 923. This capacitor 928 merely rounds off the transition in the limiter voltage.

On playback, it is desirable that the limit voltage be determined by the potentiometer 929 instead of the potentiometer 927, as was the case during a record operation. In order to do this, the playback function, which switches from ground potential during record to −14 volts during playback is applied to the input lead 9701. When the input lead is at −14 volts during playback, this voltage, applied through diode 930 and resistor 931 to the base of transistor 924, renders transistor 924 conducting. When the transistor 924 is turned on by the playback voltage, the transistor 925 is turned on. When the transistor 925 is rendered conducting, the collector of transistor 925 goes negative and this negative-going voltage is applied through diode 933 to switch off the transistor 926. This disconnects the potentiometer 927 from the circuit which determines the limit voltage at the output lead 9404. Now, the output limit voltage at the lead 9404 is determined by the circuit including diode 916, transistor 925, diode 934, potentiometer 929 and resistor 919. As before, the voltage across resistor 919 is applied through resistor 922 to the base of the emitter follower 923. The voltage across resistor 919 determines the limit voltage at the output lead 9404. On the playback, the switching of the transistor 908 and 909 has no effect on the limit voltage at the output 9404.

*Record injection signal unit*

In order to produce a variable amplitude 7–8 kc. injection signal which is used to vary the gain of each of the amplifiers, the circuitry shown in FIGS. 10A and 10B is provided.

The record injection signal unit is supplied with a 7–8 kc. 6 volt peak-to-peak square wave signal which is applied at the input lead 10001. This 7–8 kc. signal may be supplied from any suitable source, for example, a saturable magnetic core oscillator which switches at a 7-8 kc. rate.

The linearly varying control signal used to vary the amplitude of the 7-8 kc. injection signal is obtained from the D.C. expander circuitry and is applied to the record injection signal unit at the lead 10501. This linearly varying signal is applied to the base of a transistor 1001 which is connected as an emitter follower. The emitter of this transistor is connected to the base of a second transistor 1002 having a lamp connected in the emitter circuit thereof. The lamp 1003 has an intensity determined primarily by the current flowing through transistor 1002. In order to supply a small amount of current at all times, so that the lamp never goes out completely, a resistor 1004 is connected in shunt with transistor 1002. By providing some of the current to lamp 1003, the resistor 1004 decreases the load requirement on transistor 1002 and makes it less susceptible to overload. Also connected in circuit with the lamp and the transistor is a feedback photoresistor 1005. The photoresistor 1005 is connected in series with an adjusting resistor 1006 to the base of transistor 1002. The inclusion of feedback photoresistor 1005 in the base circuit of the transistor 1002 results in a rapid smoothing out of the intensity of the light intensity from the lamp 1003, as explained in conjunction with the feedback photoresistor included in the circuit with the lamp 501.

The lamp 1003 controls the resistance of photoresistors 1007 and 1008 which are connected in circuit with transistors which control the amplitude of the 7-8KC injection signal. The 7-8KC injection signal is coupled through capacitor 1009 and resistor 1010 to the base of the transistor 1011. The operating point for the transistor 1011 is determined by the voltage divider including resistors 1012 and 1013. The voltage at the junction point of these resistors is connected through a resistor 1014 to the base of transistor 1011.

The amplitude of the injection signal applied to the base of transistor 1011 is determined by the impedance of the A.C. path including the capacitor 1015, the photoresistor 1007 and the resistor 1017. The resistance of photoresistor 1007 is determined by the intensity of the lamp 1003. The intensity of the lamp 1003 varies in a programmed manner to change the amplitude of the injection signal. Since the injection signal is fed through a relatively large resistance 1010 to the base of transistor 1011, the amplitude of the signal at the base depends upon the A.C. impedance from the base to ground. The A.C. impedance from base to ground is determined in part by the resistance of the photoresistor 1007 and as the resistance of this photoresistor decreases, the amplitude of the injection signal applied to the base of resistor 1011 decreases.

The resistor 1017 may be selectively switched into shunt with the photoresistor 1007. When the switch 1018 is closed, thereby connecting the resistor 1017 in shunt with photoresistor 1007, and reducing the impedance of the parallel network 1007 and 1017, the amplitude of the injection signal is reduced. It is desirable to do this when the AGC in the amplifier is responsive to both the seismic signal and the injection signal. This condition is brought about my manually switching the switch 1018 to the on position. In this condition, ground potential is applied through contact 1018a to the resistor 1017, thereby decreasing the amplitude of the injection signal.

Also, ground potential is applied through contact 1018b and the lead 10401 to the AGC circuitry and the amplifier thereby making this circuitry responsive to both the injection signal and the seismic signal.

The transistor 1011 acts as an emitter follower and the injection signal is developed across the emitter resistance 1019. The injection signal is connected through resistor 1020 to the base of a transistor 1021 which, together with the transistor 1022, forms a switch. The amplitude of the injection signal applied to the base of transistor 1021 is determined by the A.C. impedance to ground of the circuit including capacitor 1027 and photoresistor 1008. As the impedance of the photoresistor 1008 decreases, the amplitude of the injection signal applied to the base of transistor 1021 decreases.

Normally, in a record operation, the 7-8KC injection signal is coupled through transistor 1021 and through the emitter follower 1023 to the emitter circuit of transistor 1023 which includes an emitter resistor 1024, a coupling capacitor 1025 and a resistor 1026. The injection signal is coupled to the output lead 10402. This injection signal is applied to the amplifier at the lead 41002 in order to vary the gain of the amplifier in a programmed manner.

During playback, it is also desirable to use an injection signal. However, the injection signal usually does not have the same amplitude and programmed varying amplitude as does the injection signal used during recording. Therefore, it is desirable to disconnect the varying amplitude record injection signal from the output lead 10402 and to develop an injection signal with either a steady amplitude or an amplitude which varies in a programmed manner required specifically for playback. For this purpose, the playback function is applied to the input lead 10701. The playback signal is at ground potential during recording and at —14 volts during playback. During record, the lead 10701 is at ground and the diode 1028 is back-biased. However, during playback the lead 10701 switches to a —14 volts and this acts through diode 1028 and resistor 1029 to clamp the emitter of transistor 1011 at a negative level. This voltage level also cuts off the transistor 1021.

The playback function at the lead 10701 is also applied through diode 1030 and resistor 1031 to the base of the transistor 1032 which determines the operating point of the transistor 1022. During record, when a ground potential is applied to the diode 1030, the collector of transistor 1032 and the base of transistor 1022 are held at approximately —10 volts, thereby cutting off transistor 1022. However, during playback the base of the transistor 1022 is at an operating point of approximately —7 volts, because of the action of transistor 1032, thereby permitting the transistor 1022 to act as an emitter follower. In this situation, the 7-8KC injection signal on the lead 10001 is connected through the gain setting potentiometer 1033, the coupling capacitor 1034, the resistor 1035, the emitter follower 1036, and the resistor 1037 to the base of the emitter follower 1022. The injection signal from this path is then coupled through the emitter follower 1022 and the emitter follower 1023 to the output lead 10402. If a constant amplitude injection signal is desired on playback, the switch 1038 is closed, thereby shunting the photoresistor 1039 and the resistor 1037. If, however, it is desirable to change the amplitude of the injection signal in a programmed manner, then the switch 1038 is opened and the amplitude of the injection signal is determined by the resistance of the photoresistor 1039. The resistance of this photoresistor is determined by the intensity of the lamp 1040. This lamp is supplied with current by the transistor 1041.

On playback, it is often desirable to increase the gain of the amplifier after the trip time, that is, after the time of the time break signal or the first up-hole return. The trip function applied to the input lead 10801 goes from —13 volts at reset to —1 volt at the trip time. During reset, the capacitors 1042 and 1042a are charged through the diode 1043 and the resistors 1044 and 1044a. In order to accelerate the charging of the capacitor 1042a, a diode 1045 is provided. This diode conducts during the charging of the capacitor 1042a, but is cut off when the capacitor 1042a is discharging. When the trip function voltage goes to —1 volt, at trip time, the diode 1043 is back-biased and the capacitors 1042 and 1042a discharge.

When the diode 1043 is open, the capacitors 1042 and 1043 discharge through the resistor 1046 and the potentiometer 1047. This produces an exponential wave form at the base of transistor 1048. The emitter of transistor 1048 is connected through resistor 1049 to the base of the transistor 1041, which determines the intensity of the lamp 1040.

Therefore, during playback, with the switch 1038 in the open position, the magnitude of the injection signal is controlled in an exponential manner by the intensity of the lamp 1040. The intensity of the lamp 1040 is steady up until the trip time and thereafter the intensity of the lamp decreases exponentially. As the intensity of the lamp decreases exponentially, the resistance of the photoresistor 1039 increases exponentially, thereby producing a smaller emplitude injection signal at the output 10402. This smaller amplitude injection signal acts through the AGC circuitry of the amplifier of FIG. 4 to increase the gain of the amplifier.

*Lamp and photoresistor housing, FIGS. 11A and 11B*

An assembly of the type shown in FIGS. 11A and 11B is provided for the lamp, 501 for example, and the photoresistors, 211 and 227 for example, which control the gain of the preamplifier. The feedback photoresistors, 518 for example, are also housed in this assembly. A side sectional view of the assembly is shown in FIG. 11A and a bottom view is shown in FIG. 11B. The assembly includes a hollow center portion 1101 which houses the lamp 1102. A plurality of passageways, such as those indicated at 1103, 1104, 1105 and 1106, extend from the outside of the unit to the hollow center portion 1101. Each of the passageways has a photoresistor, photoresistors 1107 and 1108 being shown, positioned therein. Light from lamp 1102 is incident upon all of the photoresistors positioned in the passageways. Each passageway is provided with an adjusting screw such as the screw 1109 positioned at the opening of passageway 1103. By adjusting the screw 1109, the amount of light falling on the photoresistor 1107 may be changed. This screw adjustment is provided to compensate for differences in the photoresistor characteristics and differences in the light incident upon different photoresistors.

*Operation of amplifier system*

The sequence of operation of the amplifier system during a recording and during a playback operation will now be described.

Prior to a recording operation, the amplifying system has been connected to the geophones and detonator as shown in FIG. 1. The detonator 128 and the up-hole detector 102 share a common cable 129–130 which is connected to the lines 613–614 in the blaster trigger. The operator at the recording truck checks with personnel in the vicinity of the shot-hole to determine if they are prepared for detonation of the dynamite charge. The operator at the recording truck then initiates the detonation as follows. The power relay is energized thereby applying power to all of the amplifier and control units. On the next revolution of the drum 165, the cam carried by the drum closes the switch contacts 178, thereby connecting the line 6178 to ground. The capacitor 601 discharges and the discharge of this capacitor energizes the relay 608. Relay contacts 608a and 608b are actuated to their lowermost position. The capacitor 609 is discharged in a ringing circuit which applies a pulse to the lines 613–614. This pulse is transmitted over the lines 129–130 through transformer 179 to detonator 128. After a suitable time delay, the detonator 128 produces a pulse on lines 180–181 which explodes the charge of dynamite in shot-hole 101. The detonation of the dynamite charge produces seismic waves which are reflected from subsurface geophysical interfaces and detected by the geophones 103–127. The subsequent seismic signals from the geophones 103–127 are recorded in separate channels on the drum 165.

The same pulse which detonates the charge of dynamite is the time break signal which is coupled over transformer 182 and lines 129–130 to the input lines 613–614 of the blaster trigger. By the time of the occurrence of the time break signal, the circuit energizing the relay 608 has relaxed and the relay contacts 608a and 608b have returned to their uppermost position. The time break signal is coupled through transformer 620 and over output lead 6101 to a modulator associated with a recording head on drum 165. The time break signal is recorded on a seismic trace on the drum 165.

The time break signal is also coupled through secondary winding 620c and is applied over the leads 6707 and 7607 to the up-hole amplifier. The time break signal is amplified in the up-hole amplifier and is applied over the leads 7803 and 8703 to the trip unit. The time break signal switches the flip-flop, including transistors 801 and 802, from the reset condition to the trip condition. The flip-flop produces a trip function in response to the initiation of seismic signals which are to be recorded.

In response to this trip function, the control unit produces several control functions which change the characteristics of the amplifier system.

The D.C. expander of FIG. 5 provides means responsive to the trip function for controlling the impedance of each of the photoresistors in the preamplifiers.

The trip function from the flip-flop, including resistors 801 and 802, is applied over the leads 8502 and 5802 to cut off the transistor 507. This allows the capacitor 502 to discharge thereby producing a wave form which varies in the desired manner. This wave form is applied through emitter followers 509, 515 and 517a to the lamp 501 and causes the light intensity of the lamp 501 to vary in a predetermined manner. Light from the lamp 501 is incident upon photoresistors 211 and 227 in each of the preamplifiers. The photoresistors 211 and 227 are connected in the emitter circuits of transistor amplifiers 203 and 223 so that the gain of these amplifiers varies. The gain of the preamplifiers is programmed to increase as time after shot-time increases. This compensates for the reduced amplitude of seismic returns. The manner in which the gain varies can be changed by adjusting the resistor units 506 and 512 and the potentiometers 508 and 511 so that the gain change is most suitable for the particular layout of geophones and shot-point from which the seismic signals are being received.

The record injection signal unit shown in FIG. 10A provides means for producing an injection signal the amplitude of which acts through each of the automatic gain control circuits in the amplifiers 161–164 to control the gain of each of the amplifiers. As previously explained, the D.C. expander of FIG. 5 produces a wave form on output lead 51001 which varies with time after the transition in the trip function applied to input lead 5802. The varying wave form on lead 51001 is applied over lead 10501 and through emitter followers 1001 and 1002 to vary the light intensity of the lamp 1003. Light from lamp 1003 is incident upon photoresistors 1007 and 1008. Changes in the resistance of photoresistors 1007 and 1008 change the amplitude of the 7–8KC injection signal applied to input lead 10001 and coupled through capacitor 1009, resistor 1010, emitter follower 1011, switch 1021, emitter follower 1023 and capacitor 1025 to the output lead 10402. The varying amplitude injection signal is applied over leads 10402 and 41002 to the input to each of the amplifiers. The injection signal at input 41002 and the seismic signals at input 4303 are amplified in the amplifying stages including transistors 417, 420, 435, 436 and 437. The injection signal is coupled through emitter follower 447 and capacitor 448 to the automatic gain control circuitry. The automatic gain control circuitry varies the light intensity of lamp 486 in accordance with the amplitude of the injection signal. Light from the lamp 486 is incident upon the photoresistors 415 and 433. Changes in the resistance of photoresistors 415 and 433 change the gain of the amplifier.

The limiter circuitry shown in FIG. 9 provides means responsive to the trip function for producing a limit voltage which varies the attack time of the automatic gain control circuits in the amplifiers. When the trip function applied to input lead 9801 goes from −13 volts to −1 volt, the diode 901 is back-biased and the capacitors 905 and 906 are discharged. This discharge is sensed by the transistors 908 and 909 which switch conducting states a predetermined time after the transition in the trip function. When the transistors 908 and 909 switch conducting states, a limit voltage is produced by emitter follower 923 and this limit voltage appears at output lead 9404. The limit voltage upon lead 9404 is applied over lead 4904 to the base of transistor 477. The limit voltage controls the conductivity of transistor 477 which determines the attack time of the automatic gain control circuit. The attack time is increased as time after shot-time increases so that less distortion will be introduced into the seismic signals which have a lower amplitude as time increases.

Prior to a playback operation, switch 733 is switched from the record to the playback position, thereby applying −14 volts to several points in the control circuits. Upon initiation of the played back seismic signals, the flip-flop including transistors 801 and 802 is switched to produce the trip function. A predetermined time after the transition in the trip function applied to lead 9801, the transistors 908 and 909 switch conducting states. The voltage on the leads 9305 and 3905 switches from −20 volts to −4 volts. This switch in voltage energizes the relay windings 323a–323f. The relay contact 323 is actuated from its lowermost to its uppermost position. Previously the seismic signals had been connected directly from the input 3122, through relay contact 323 and relay contact 324 to the output lead 3403. After actuation of the relay 323 the played back seismic signals are applied through the playback filter 306 to the output lead 3403.

The limiter shown in FIG. 9 produces a limit voltage on output lead 9404 the magnitude of which is determined by the potentiometer 929.

The playback injection signal unit shown in FIG. 10B is responsive to the trip function applied at lead 10801 to change the amplitude of the injection signal applied to the amplifiers over the lead 10401. On playback the injection signal is of a constant amplitude if the switch 1038 is closed. If the switch 1038 is open, the injection signal varies in amplitude in a programmed manner.

While there has been described a preferred embodiment of the invention, it will be understood that further modifications may be made without departing from the spirit and scope of the invention as set forth in the appended claims. The appended claims are, therefore, intended to cover any such modifications within the true spirit and scope of the invention.

What is claimed is:

1. An amplifying system for recording a plurality of seismic signals on a reproducible medium and for playing back said seismic signals from said producible medium comprising a plurality of preamplifiers, a seismic signal source being connected to the input of each preamplifier, each of said preamplifiers including at least one transistorized stage of voltage amplification, a source of variable impedance for each of said stages, said source of variable impedance being connected in the emitter circuit of each stage, a plurality of amplifiers, means for applying the output of each preamplifier to an input to an associated amplifier, the output of each amplifier being applied to said reproducible medium for recording thereon, and a control unit, said control unit including means for producing a trip function in response to the initiation of seismic signals, and means responsive to said trip function for controlling the impedance of each of said variable impedance sources in a predetermined manner.

2. The system recited in claim 1 wherein the means for controlling the impedance of each of said variable impedance sources includes a variable intensity light source, means responsive to said trip function for varying the intensity of said light sources in a predetermined manner, and wherein each of said sources of variable impedance includes a photoresistor, said photoresistors being connected in the emitter circuits of said transistorized stages of voltage amplification in said preamplifiers, light from said light source being applied to said photoresistors to control the gain of said preamplifiers.

3. The system recited in claim 1 wherein each of said amplifiers includes an automatic gain control circuit and wherein said control unit includes means for producing an injection signal the amplitude of which acts through each of said automatic gain control circuits to control the gain of each of said amplifiers, said last named means including means for producing a constant frequency injection signal, said injection signal having an amplitude which varies in a predetermined manner after the occurrence of said trip function, said injection signal being applied to the input to each of said amplifiers, the automatic gain control circuitry of each of said amplifiers being responsive to the amplitude of said injection signal to vary the gain of said amplifier.

4. The system recited in claim 3 wherein said automatic gain control circuits include means for varying the attack time of said automatic gain control circuit and wherein said control unit includes means for producing a limit voltage, said limit voltage being applied to said means for varying the attack time of said automatic gain control circuits, and means responsive to said trip function for switching the level of said limit voltage a predetermined time after the occurrence of said trip function so that the attack time of said AGC circuits becomes longer as the time after the initiation of said seismic waves increases.

5. The system recited in claim 1 wherein the means for applying the output of each preamplifier to an associated amplifier includes a plurality of filter units, each of said filter units having a record filter for accentuating a particular frequency band of the seimic signals to be recorded, the output of each preamplifier being connected to an input to an associated record filter, and means for applying the output of said record filter to the input to an associated amplifier.

6. The system recited in claim 5 wherein each of said filter units further includes a playback filter for accentuating a particular frequency band of the played back seismic signal, means for applying a seismic signal played back from said reproducible medium to the input to each playback filter, and wherein said means for connecting the output of each record filter to the input to an associated amplifier filter includes a switch for selectively connecting the output of the playback filter to the input to an associated amplifier when said system is in playback mode of operation or for connecting the output of said record filter to said associated amplifier when said system is in a record mode of operation.

7. The system recited in claim 6 including means responsive to said trip function for selectively connecting said played back seismic signal to the input to said playback filter or directly to the input of said amplifier whereby said played back seismic signal is connected directly to said amplifier during the initial time period of said seismic signal and is connected through said playback filter to said amplifier thereafter, said last named means being operable when said system is in the playback mode of operation.

8. The system as set forth in claim 1 wherein each of said amplifiers is adapted to provide variable gain amplification of an input signal and wherein each of said amplifiers includes a transistor, said input signal being applied between the base of said transistor and a common reference potential, a variable impedance connected between the emitter of said transistor and said common reference potential, and means for varying said variable impedance so that the gain of said amplifier varies in a predetermined manner.

9. The amplifier recited in claim 8 wherein said variable impedance includes two parallel circuits connected between said emitter and said common reference potential, the first of said circuits including a fixed resistance, the second of said circuits including an A.C. coupling reactance connected to said emitter and a variable resistance connected between said A.C. coupling reactance and said common reference potential so that changes in said variable resistance affect only the A.C. gain of said amplifier and do not change the D.C. operating point at the collector of said transistor.

10. The amplifier recited in claim 9 wherein said A.C. coupling reactance is a capacitor, wherein said variable resistance is a photoresistor and wherein said means for varying said variable impedance includes a variable intensity light source positioned so that said light is incident upon said photoresistor.

11. An amplifier system comprising a preamplifier and a serially connected main amplifier, said preamplifier comprising at least two transistorized stages of voltage amplification, a source of variable impedance for each of said stages, means for connecting said sources in the emitter circuit of each stage, means for controlling the impedance of each of said sources in accordance with a predetermined program, said main amplifier including at least two losser networks separated by at least one stage of voltage amplification, a feedback circuit, means in said feedback circuit for varying the effect of said losser networks in accordance with a predetermined program, an AGC circuit in said feedback network having a variable time constant that varies automatically in response to the seismic signal, a losser control network for regulating said time constant, and means responsive to an initiating signal for applying start signals to said losser control network and to said variable impedance control program means.

12. The amplifier system recited in claim 11 wherein each source of variable impedance includes a photoresistor, wherein the means for controlling the impedance of each of said sources in accordance with a predetermined program includes a variable intensity light source, a capacitor, a constant current path, means for discharging said capacitor through said constant current path and means responsive to the voltage across said capacitor for varying the intensity of said light source.

13. A seismic exploring system wherein seismic impulses produce seismic waves to be detected and recorded on a reproducible medium comprising a source of seismic impulses, a plurality of detectors spaced from said source for detecting said seismic waves, said detectors producing seismic signals indicative of said seismic waves, means for initiating the production of said seismic waves and resultant seismic signals, a plurality of preamplifiers, the output of each of said detectors being applied to the input to an associated preamplifier, a plurality of amplifiers, each of said amplifiers including a feedback circuit, means for applying the output of each of said preamplifiers to an associated one of said amplifiers, the output of each amplifier being applied to said reproducible medium for recording thereon, a control unit, said control unit including means for producing a trip function in response to the initiation of seismic signals, means responsive to said trip function for producing an expander signal, said expander signal being applied to each of said preamplifiers to control the gain thereof, said expander signal being variable in accordance with a program which provides a low initial preamplifier gain and an increasing gain after the initiation of said seismic signals, means for changing the program of said expander signal in accordance with the spacing of said plurality of detectors from said source of seismic impulses, means responsive to said trip function for producing a limit voltage, said limit voltage being applied to the feedback circuits in each of said amplifiers, means in each of said feedback circuits responsive to said limit voltage, means for switching said limit voltage to a level which increases the response time of said feedback circuits at a time after the initiation of said seismic signals, means for changing said level of said limit voltage in accordance with the spacing of said plurality of detectors from said source of seismic impulses, means for producing an injection signal the amplitude of which acts through each of said feedback circuits to control the gain of each of said amplifiers, said last named means including means for producing a constant frequency injection signal, said injection signal having an amplitude which varies to increase the gain of said amplifiers after the occurrence of said trip function, said injection signal being applied to the input to each of said amplifiers, the feedback circuitry of each of said amplifiers being responsive to the amplitude of said injection signal to vary the gain of said amplifier.

14. The system recited in claim 13 wherein each of said preamplifiers includes at least one transistorized stage of voltage amplification, a source of variable impedance including a photoresistor for each stage, said source of variable impedance being connected in the emitter circuit of each stage, a variable light source positioned to vary the impedance of said photoresistors, and means for varying the intensity of said light source in accordance with said expander signal.

References Cited by the Examiner
UNITED STATES PATENTS

| | | | |
|---|---|---|---|
| 2,838,742 | 6/1958 | McManis | 340—15.5 |
| 2,939,107 | 5/1960 | Ball | 340—15.5 |
| 3,048,817 | 8/1962 | Greening | 340—15.5 |
| 3,083,341 | 3/1963 | White et al. | 340—15.5 |
| 3,087,120 | 4/1963 | Schoellhorn et al. | 340—15.5 |
| 3,167,722 | 1/1965 | Weller | 330—59 |
| 3,188,575 | 6/1965 | Sheffet | 340—15.5 |
| 3,202,926 | 8/1965 | Ford et al. | 330—59 |

BENJAMIN A. BORCHELT, *Primary Examiner.*

R. M. SKOLNIK, *Assistant Examiner.*